(12) United States Patent
Horiuchi

(10) Patent No.: US 7,292,287 B2
(45) Date of Patent: Nov. 6, 2007

(54) STRUCTURE AND METHOD FOR FIXING ELECTRICAL APPARATUS SUCH AS TELEVISION

(75) Inventor: Yasuo Horiuchi, Daito (JP)

(73) Assignee: Funal Electric Co., Ltd., Daito (JP)

( * ) Notice: Subject to any disclaimer, the term of this patent is extended or adjusted under 35 U.S.C. 154(b) by 582 days.

(21) Appl. No.: 10/884,703

(22) Filed: Jul. 3, 2004

(65) Prior Publication Data

US 2005/0052581 A1    Mar. 10, 2005

(30) Foreign Application Priority Data

Jul. 3, 2003    (JP) ............................. 2003-270597

(51) Int. Cl.
*H04N 5/645*    (2006.01)
*H05K 7/14*    (2006.01)
*F16M 13/00*    (2006.01)

(52) U.S. Cl. ...................... 348/839; 348/825; 248/918; 361/681

(58) Field of Classification Search ................ 348/552, 348/825, 826, 836, 838, 839; 248/346.03, 248/346.05, 346.06, 918, 919; 312/7.2, 223.6; 242/170, 121, 398, 176.1; 361/679–683, 361/728–730, 724–726; 174/535, 542
See application file for complete search history.

(56) References Cited

U.S. PATENT DOCUMENTS

| | | | |
|---|---|---|---|
| 5,710,600 A * | 1/1998 | Ishii et al. .................. | 348/563 |
| 6,206,318 B1 * | 3/2001 | Glass ....................... | 242/400.1 |
| 6,209,831 B1 * | 4/2001 | Kiplinger et al. ...... | 248/220.31 |
| 6,698,560 B2 * | 3/2004 | Reardon et al. .......... | 191/12 R |
| 2004/0035972 A1 * | 2/2004 | Glass ....................... | 242/388.6 |
| 2004/0246387 A1 * | 12/2004 | Horiuchi ................... | 348/825 |
| 2005/0056443 A1 * | 3/2005 | Pagoto et al. ............ | 174/50 |

FOREIGN PATENT DOCUMENTS

| | | |
|---|---|---|
| JP | 05-068220 | 3/1993 |
| JP | 09-037191 | 2/1997 |
| JP | 09-154656 | 6/1997 |

OTHER PUBLICATIONS

JP Utility Model S55-150552 application Tomokatu Saito.
JP published Utility Model S55-150552 Oct. 30, 1980 Tomokatu Saito.

* cited by examiner

*Primary Examiner*—Victor R. Kostak
(74) *Attorney, Agent, or Firm*—Peter Ganjian

(57) ABSTRACT

To fix a TV (electrical apparatus mounted) having a power cord (insulated electric wire) to a DVD player (mounting body) when the TV is mounted on the DVD player, the DVD player is provided with a main body (a part of a main body) and a hook member fixed to the main body. The position on the main body at which the hook member is fixed is changeable, and the cord is securely wound around the hook member. This arrangement is convenient, eliminating the necessity of separately preparing a member such as a belt, while enabling to easily and securely fix, to a mounting body, various types of TVs having respective attaching positions where an insulated electric wire is attached, to effectively prevent the TV from falling down in the event of an accident such as an earthquake.

13 Claims, 21 Drawing Sheets

DVD VIEWING SYSTEM 100

FRONT VIEW

PERSPECTIVE VIEW

STRUCTURE AND METHOD FOR FIXING ELECTRICAL APPARATUS SUCH AS TELEVISION

BACKGROUND OF THE INVENTION

1. Field of the Invention

The present invention relates to a structure for fixing an electrical apparatus such as a television to a mounting body on which the electrical apparatus is placed or mounted, and a method of fixing an electrical apparatus to a mounting body when the electrical apparatus is mounted on the mounting body.

2. Description of Related Art

As conventional techniques for preventing a television resting on a mounting body from falling down in the event of an accident such as an earthquake, the following Patent documents are known.

A technique disclosed in Patent document 1 is such that a supporting member is disposed on a back face of a television while a belt holder is fixed to an upper portion of a back face of a television mounting table. When a television is mounted on the television mounting table, a belt is caught by or attached to the supporting member and then retained by the belt holder.

Another technique disclosed in Patent document 2 is such that a band insertion hole is formed in a back face of a television, and when a television is mounted on a rack, a fitting portion of a band is inserted into the hole and then the band is secured with a screw to an upper portion of a back face of the rack.

Further another technique disclosed in Patent document 3 is such that an anchor part of a buckle is fixed to an upper portion of a back face of a stand while a receiver part for receiving the anchor part is fixed to a back face of a television, and when the television is mounted on the stand, the anchor part is inserted into and locked to the receiver part.

Still another technique disclosed in Patent document 4 is such that a square hook or generally hook-shaped small bracket is prepared, while a slit is formed in a rear portion of a bottom board of a television. When the television is mounted on a stand, a portion of the hook-shaped bracket is inserted into the slit of the television, while another portion of the hook-shaped bracket is screwed to a rear face of a top panel of the stand, so as to fix the television to the stand.

Further, in some cases, a television having a size of about 19 inches or smaller is directly mounted on an electrical apparatus such as a video cassette recorder or DVD player, for saving space.

[Patent Document 1] JP-A-9-154656
[Patent Document 2] JP-A-9-37191
[Patent Document 3] JP-A-5-68220
[Patent Document 4] JP-U-55-150552

SUMMARY OF THE INVENTION

According to the above-described conventional techniques, a television is fixed to a television mounting table or other bodies for use with the television. Therefore, in a case where the television is directly mounted on another electrical apparatus, the television can not be fixed to the electrical apparatus. In addition, the conventional techniques require the belt, band, buckle or hook-shaped bracket as an additional member. Thus, there has been a request for preventing the television from falling down in the event of an accident such as an earthquake, by fixing the television to a mounting body such as an electrical apparatus on which the television is mounted, without using such an additional member.

This invention has been developed in view of the above-described situations. Therefore, an object of the invention is to provide a structure and method for fixing, to a mounting body, various electrical apparatuses such as television to which an insulated electric wire is attached at respective attaching positions (which will be referred to as "insulated-electric-wire attaching positions"), which make it possible to easily and securely fix such electrical apparatuses to the mounting body without requiring an additional member such as a belt.

To attain the above object, an arrangement of the invention provides a structure for fixing a television to a mounting body when the television is mounted on the mounting body, for preventing the television from falling down when a vibration is imposed upon the television, the television having a cabinet, and a power cord which has an equipment end fixed to the cabinet and extends substantially backward from the cabinet, wherein the mounting body is an electrical apparatus on which the television is to be mounted, wherein the electrical apparatus has: a recessed portion on an edge formed by a bottom face and a back face of the electrical apparatus; and a hook member which is detachably fixed to one of a plurality of attaching places provided in the recessed portion so that a position at which the hook member is fixed to the recessed portion is changeable, the hook member extending substantially downward from the recessed portion when fixed to one of the attaching places so that the power cord is securely wound around the hook member, and having a pair of horizontal extensions which extend from a lower end of the hook member substantially horizontally and in respective directions which are substantially opposite, so as to prevent the power cord wound around the hook member from falling away from the hook member by the presence of the horizontal extensions, the horizontal extensions having respective prongs extending substantially upward from respective ends of the horizontal extensions, wherein the recessed portion has a plurality of fixing bores formed at the respective attaching places, wherein the hook member has an insert portion which is inserted into one of the plurality of the fixing bores and turned there so that the hook member is fixed to the recessed portion at one of the plurality of the attaching places corresponding to the one fixing bore, and wherein the power cord is securely wound around the hook member by being sequentially and repeatedly inserted from one of a pair of first intervals each defined between an upper end of each of the prongs and a ceiling of the recessed portion, into corresponding one of a pair of second intervals each defined between each of the horizontal extensions and the ceiling, and then from the other of the pair of first intervals into the corresponding second interval, so that the television is fixed to the electrical apparatus on which the television is mounted.

The hook member around which the power cord is wound is fixedly attached to one of the plurality of attaching places in the recessed portion. Since the fixed hook member extends in the direction away from the television, the power cord is inhibited from coming off from the hook member. When the power cord wound around the hook member moves downward, the power cord eventually reaches the horizontal extensions and is made unable to move any further, and thereby prevented from falling away from the hook member. Further, when the power cord moves toward the end of each extension, the power cord eventually reaches the prong extending substantially upward from the end of the extension and is made unable to move any further, and thereby prevented from falling away from the hook member, again.

Once the power cord extending from the cabinet of the television is securely wound around the hook member, the television is fixed to the electrical apparatus as a mounting body having the hook member. In this arrangement where the power cord of the television is utilized to fix the television, it is not necessary to prepare an additional member such as a belt, band, buckle or hook-shaped bracket. In this regard, the hook member fixed to the recessed portion of the electrical apparatus as the mounting body can change its position with respect to the recessed portion. Therefore, a power cord of any of various types of televisions having respective attaching positions for the power cord (which will be referred to as "power-cord attaching positions"), can be wound around the hook member which is located at a position convenient for winding the power cord. Thus, this arrangement is convenient, eliminating the necessity of preparing the additional member such as a belt, while enabling various types of televisions having respective power-cord attaching positions to be easily and securely fixed to the electrical apparatus as a mounting body. Thus, the television is prevented from falling down in the event of an accident such as an earthquake.

The arrangement is convenient and eliminates the necessity of preparing an additional member such as a belt, while enabling various kinds of televisions having respective insulated-electric-wire attaching positions to be easily and securely fixed to the electrical apparatus as the mounting body. Consequently, the television can be prevented from falling down in the event of an accident such as an earthquake.

In the above description, the term that "(the power cord) extends substantially backward from the cabinet" means that the power cord may extend obliquely backward, as well as strictly backward. The term that "the hook member extending substantially downward" means that the hook member may extend obliquely downward, as well as strictly downward. The term "substantially horizontally" implies that each of the horizontal extensions may extend horizontally obliquely in the upward or downward direction, as well as strictly horizontally. The term "respective directions which are substantially opposite" means that the horizontal extensions may extend in respective directions which are obliquely deviated from 180-degree opposite directions, as well as extend in respective directions which are strictly 180-degree opposite. The term "respective prongs extending substantially upward" means that the prongs may extend obliquely upward, as well as strictly upward. The same rule applies hereinafter.

The electrical apparatus as a mounting body may be a video cassette recorder, DVD player, or other electrical apparatuses.

The principle of the invention is applicable to a structure where an electrical apparatus other than a television is fixed to a mounting body. Thus, another arrangement of the invention provides a structure for fixing, to a mounting body, an electrical apparatus having an insulated electric wire extending therefrom, when the electrical apparatus is mounted on the mounting body, wherein the mounting body has a main body and a hook member which is fixed to the main body at a fixing position which is changeable, and wherein the insulated electric wire is securely wound around the hook member so that the electrical apparatus is fixed to the mounting body.

When the electrical apparatus is mounted on the mounting body, the insulated electric wire extending from the electrical apparatus is wound around the hook member of the mounting body, so that the electrical apparatus is fixed to the mounting body. That is, the electrical apparatus can be fixed to the mounting body by utilizing the insulated electric wire of the electrical apparatus, eliminating the necessity for preparing an additional member such as a belt. In this regard, the fixing position where the hook member is fixed to the main body of the mounting body is changeable. Therefore, it is enabled to locate the hook member at a position convenient for winding the insulated electric wire of various kinds of electrical apparatuses around the hook member. Thus, this arrangement is convenient for the user, eliminating the necessity of the preparing an additional member such as a belt, while enabling various kinds of electrical apparatus having respective insulated-electric-wire attaching positions, to be easily and securely fixed to the mounting body. Accordingly, the electrical apparatus is prevented from falling down in the event of an accident such as an earthquake.

The arrangement is convenient and eliminates the necessity of preparing an additional member such as a belt, while enabling various kinds of electrical apparatuses having respective insulated-electric-wire attaching positions to be easily and securely fixed to the mounting body. Consequently, the television can be prevented from falling down in the event of an accident such as an earthquake.

The insulated electric wire may be any conducting wire wrapped by an insulator, such as a power cord and earth cable.

As another arrangement of the invention, the mounting body may be another electrical apparatus. In this arrangement, the electrical apparatus mounted on the another electrical apparatus as the mounting body can be fixed to the another electrical apparatus.

The arrangement eliminates the necessity of preparing an additional member such as a belt, while making it possible to easily fix the electrical apparatus mounted on another electrical apparatus as the mounting body, to the another electrical apparatus.

This arrangement may be implemented such that a main body of the another electrical apparatus as the mounting body has a recessed portion on an edge formed by a bottom face and a side face of the another electrical apparatus, and the hook member has the shape of an elongated extension and is fixed to the recessed portion such that the hook member extends from the recessed portion substantially downward. Since the hook member as fixed to the recessed portion extends in the direction away from the mounted electrical apparatus, the insulated electric wire wound around the hook member does not easily come off.

The arrangement enables the electrical apparatus to be further securely fixed to the electrical apparatus as the mounting body, since the insulated electric wire is inhibited from coming off the hook member.

The side face may be any one of a lateral (right or left) face, a back face or a front face, as seen where a particular side face serves as a front face.

Although the arrangement in which the hook member extends substantially downward from the electrical apparatus is advantageous in that the insulated electric wire is inhibited from coming off from the hook member, the hook member may have the shape of an elongated extension and be fixed to a side face of the another electrical apparatus as the mounting body, so that the hook member extends in a direction substantially perpendicular to the side face. In this case also, the insulated electric wire is securely wound around the hook member so that the electrical apparatus mounted on the another electrical apparatus as the mounting body can be fixed to the another electrical apparatus.

The hook member may have various shapes. For instance, the hook member has an extension which extends from a lower end of the hook member in a direction different from a direction in which the hook member extends from the recessed portion, so that the insulated electric wire wound around the hook member is prevented from falling away from the hook member. That is, when the electric wire wound around the hook member is moved downward, the insulated electric wire eventually reaches the extension which extends from the lower end of the hook member in the direction different from the direction in which the hook member extends from the recessed portion, thereby making further downward movement of the electric wire impossible, and accordingly preventing the electric wire from falling away. Thus, the electric wire is further effectively inhibited from coming off the hook member, enabling the electrical apparatus to be fixed to the another electrical apparatus as the mounting body with enhanced reliability.

The extension may be configured such that the extension substantially horizontally extends and has a prong extending substantially upward from an end of the extension. In this arrangement, the insulated electric wire moved toward the end of the extension eventually reaches the prong extending substantially upward, and becomes unable to move further, thereby being prevented from falling away. Thus, the electric wire is further effectively inhibited from coming off the hook member, enabling the electrical apparatus to be fixed to the another electrical apparatus as the mounting body with enhanced reliability.

Further, the hook member which is fixed to the electrical apparatus as the mounting body at the changeable fixing position maybe variously configured. For instance, the hook member is detachably fixed to one of a plurality of attaching places provided in the main body of the electrical apparatus as the mounting body. Since the hook member is fixed to the electrical apparatus as the mounting body by being attached to one of the plurality of places provided in the main body, it is made possible to easily and securely fix, to the electrical apparatus as the mounting body, various electrical apparatuses having respective insulated-electric-wire attaching positions, with a simple structure.

The arrangement enables various kinds of electrical apparatuses having respective insulated-electric-wire attaching positions to be easily and securely fixed to the electrical apparatus as the mounting body, with a simple structure.

For instance, the structure including the hook member which is detachably fixed to the electrical apparatus as the mounting body may be configured such that the main body of the electrical apparatus as the mounting body has a plurality of fixing bores formed at the respective attaching places, and the hook member has an insert portion which is inserted into one of the plurality of fixing bores and turned there so that the hook member is fixed to the main body at one of the plurality of the attaching places corresponding to the one fixing bore. According to this arrangement, the hook member can be attached to any one of the plurality of fixing bores and fixed there, simply by inserting the insert portion of the hook member into the one fixing bore and turning the insert portion there.

The arrangement enables to provide a simple structure where the hook member can be detachably fixed to the main body by an easy and simple manipulation.

Alternatively, the hook member may be fixed to one of the plurality of the attaching places, by inserting the insert portion into one of the plurality of fixing bores and sliding the insert portion in a direction other than a direction in which the insert portion is inserted into the one fixing bore, so that the hook member is fixed to the main body at the one attaching place corresponding to the one fixing bore. That is, the insert portion of the hook member is inserted into any one of the plurality of fixing bores of the main body and slidingly moved in the direction different from the inserting direction, so that the hook member is attached to the one fixing bore and fixed there.

The arrangement can provide a simple structure which enables the hook member to be detachably fixed to the main body of the electrical apparatus as the main body of the electrical apparatus as the mounting body.

The hook member may be slidable on a surface of the main body and fixable to the main body at a position within a movable range of the hook member. That is, the hook member can be fixed to the main body at a desired position within the movable range defined on the surface of the main body, thereby enabling the insulated electric wire of various kinds of electrical apparatuses to be wound around the hook member which is located at a convenient position for the winding.

The slidable hook member may consist of a plurality of slidable hook members.

For instance, as defined in claims 19-26, a structure including the hook member slidable on the surface of the main body may be such that the main body has a fixing slit having a length corresponding to the movable range of the hook member, and the insert portion is a slit insert portion which is inserted into the fixing slit and turned around an axis extending in a direction substantially identical to the direction in which the slit insert portion is inserted into the fixing slit, the hook member being fixed to the main body at a desired position within the movable range by turning the slit insert portion around the axis to a predetermined fix position which is an angular position of the slit insert portion for locking the hook member, when the hook member is located at the desired position, and being unfixed to be slidable along the fixing slit by turning the slit insert portion around the axis to a predetermined move position which is another angular position of the slit insert portion for allowing the sliding movement of the hook member. That is, the hook member can be fixed to the main body at any position along the fixing slit, simply by turning the slit insert portion.

The arrangement makes it possible to locate the hook member at a position further convenient for winding the insulated electric wire of various kinds of electrical apparatuses around the hook member, improving the convenience for the user, while enabling various kinds of electrical apparatuses to be fixed to the electrical apparatus as the mounting body with enhanced reliability.

The hook member may be configured such that the insert portion is a slit insert portion which is inserted into the fixing slit such that the hook member is slidable along the fixing slit, and the hook member has a fixing screw capable of fixing the hook member to the main body at a position along the fixing slit. That is, the hook member can be fixed to the main body at any position along the fixing slit, by tightening the fixing screw.

The arrangement enables the hook member to be detachably fixed to the main body with a simple structure.

In this regard, the hook member may be slidable in a substantially horizontal direction on the electrical apparatus as the mounting body. According to this arrangement, various electrical apparatuses having respective insulated-electric-wire attaching positions can be easily and securely fixed to the electrical apparatus as the mounting body, with a simple structure.

Alternatively, the hook member may be slidable in a substantially vertical direction on the electrical apparatus as the mounting body. According to this arrangement, the tension of the insulated electric wire can be suitably adjusted by the vertical movement of the hook member around which the insulated electric wire is wound, which contributes to effectively prevent the electrical apparatus from falling down in the event of an accident such as an earthquake.

The present invention is applicable to a structure where two electrical apparatuses each having an insulated electric wire are fixed to each other. Thus, as defined in claim 11, the invention provides a structure for fixing a first electrical apparatus as a mounting body and a second electrical apparatus mounted on the first electrical apparatus, to each other, each of the first electrical apparatus and the second electrical apparatus having an insulated electric wire extending therefrom, wherein one of the first electrical apparatus and the second electrical apparatus has a main body, and a hook member which is fixed to the main body, the position in the main body at which the hook member is fixed being changeable, and the insulated electric wire of the other of the first electrical apparatus and the second electrical apparatus being securely wound around the hook member, so that the first and second electrical apparatuses are fixed to each other.

When an electrical apparatus is mounted on another electrical apparatus as the mounting body, the two electrical apparatuses can be fixed to each other by winding the insulated electric wire extending from one of the two electrical apparatuses around the hook member fixed to the other electrical apparatus. According to this arrangement where the electric wire is utilized for the fixing, an additional member such as a belt is not necessary. In this regard, the position at which the hook member is fixed to the main body of the relevant electrical apparatus can be changed. Thus, it is possible to locate the hook member at a position convenient for winding the insulated electric wire of any of various kinds of electrical apparatuses having respective insulated-electric-wire attaching positions. Therefore, this arrangement is convenient, eliminating the necessity of preparing an additional member such as a belt, while enabling one of various electrical apparatuses having respective insulated-electric-wire attaching positions and another electrical apparatus to be easily and securely fixed to each other.

The arrangement is convenient and eliminates the necessity of preparing an additional member such as a belt, while enabling various kinds of electrical apparatuses having respective insulated-electric-wire attaching positions to be easily and securely fixed to another electrical apparatus. Consequently, the electrical apparatus mounted on the another electrical apparatus can be prevented from falling down in the event of an accident such as an earthquake.

It is noted that the above-described arrangement where the first and second electrical apparatuses are fixed to each other includes at least: a first mode where the second electrical apparatus mounted on the first electrical apparatus as a mounting body is fixed to the first electrical apparatus; and a second mode where the first electrical apparatus on which the second electrical apparatus is mounted is fixed to the second electrical apparatus.

The gist of the invention also resides in a method for fixing an electrical apparatus to a mounting body. Thus, the invention also provides a method for fixing to a mounting body an electrical apparatus having an insulated electric wire extending therefrom, when the electrical apparatus is mounted on the mounting body, the method comprising steps of: providing the mounting body having a main body and a hook member which is fixed to the main body, the position in the main body at which the hook member is fixed being changeable, and the insulated electric wire being able to be wound around the hook member; and securely winding the insulated electric wire around the hook member so that the electrical apparatus is fixed to the mounting body.

Further, the invention provides a method for fixing a first electrical apparatus as a mounting body and a second electrical apparatus mounted on the first electrical apparatus, to each other, each of the first electrical apparatus and the second electrical apparatus having an insulated electric wire extending therefrom, the method comprising steps of: providing one of the first electrical apparatus and the second electrical apparatus with a main body and a hook member which is fixed to the main body, the position in the main body at which the hook member is fixed being changeable, and the insulated electric wire being able to be wound around the hook member; and securely winding the insulated electric wire of the other of the first electrical apparatus and the second electrical apparatus around the hook member, so that the first and second electrical apparatuses are fixed to each other.

Thus, the principle of the present invention is applicable to the method for fixing an electrical apparatus also; the arrangement set forth may be applied to the method.

DETAILED DESCRIPTION OF THE PREFERRED EMBODIMENTS

There will be described in detail presently preferred embodiments of the invention, in the order as follows:
(1) Illustration of a TV fixing structure according to a first embodiment of the invention
(2) Operation of a television fixing structure
(3) Other embodiments
(4) Conclusion

Figure 1:
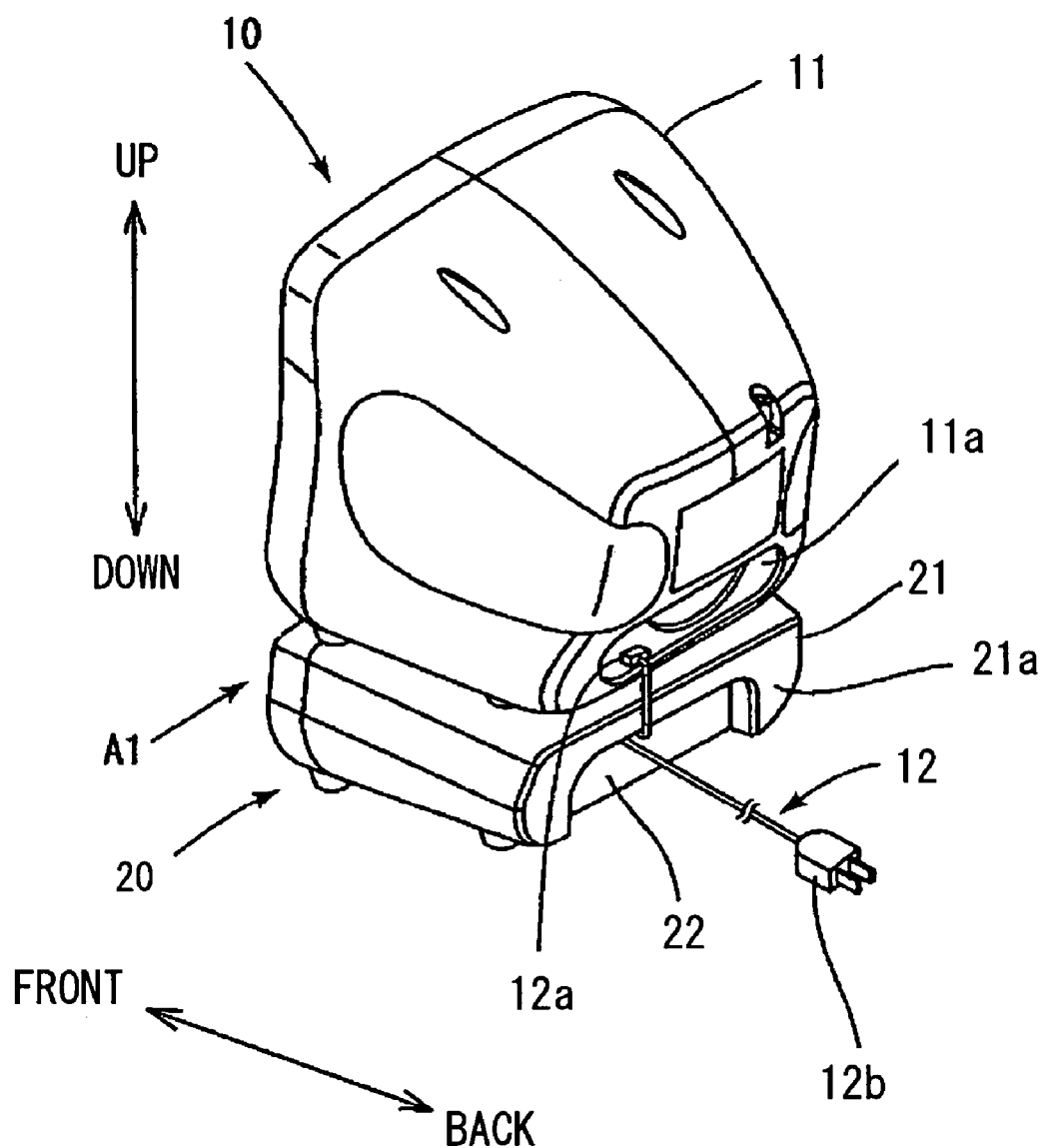
FIG. 1 is a perspective view of a DVD viewing system with a structure for fixing a television according to a first embodiment of the invention.

(1) Illustration of a Television Fixing Structure According to a First Embodiment of the Invention FIG. 1 is a perspective view (top, right lateral, and back views) of a DVD viewing system 100 to which is applied a structure for fixing a television (structure for fixing an electrical apparatus) according to a first embodiment of the invention. The DVD viewing system 100 comprises a DVD player 20 as an electrical apparatus which serves as a mounting body, and a television (which will be referred to as TV) 10 as an electrical apparatus which is mounted on the electrical apparatus as the mounting body, or the DVD player 20. In FIG. 1, the upper left side corresponds to a front side of the system, the lower right side corresponds to a back side of the system, and the upper and lower sides of FIG. 1 respectively correspond to the upper and lower sides of the system.

The TV 10 is of a relatively small size, i.e., 19 inches or smaller, and constructed such that a cabinet 11 made of a resin accommodates internal devices including a Braun tube (not shown), a board, and others. A control circuit mounted on the board operates to control relevant devices to receive airwaves, or signals in predetermined formats from the DVD player 20, and to output corresponding video and audio signals to relevant devices. Since a screen of the Braun tube is disposed on the front side of the TV 10, the center of gravity of the TV 10 is located on its front side. Hence, when a vibration is imposed, for instance, in the event of an earthquake, the TV 10 tends to fall down frontward.

The TV 10 has a power cord (insulated electric wire) 12 extending backward (or substantially backward) from a back face 11a of the cabinet 11. The power cord 12 has an equipment end 12a made of a resin which is fixedly attached to the back face 11a of the cabinet. The mechanical strength of the equipment end 12a of the power cord 12 is determined such that the equipment end 12a can bear a given load in a tensile test; for instance, the strength may be such that a main body of the TV 10 can be suspended by the power cord 12.

Figure 2:
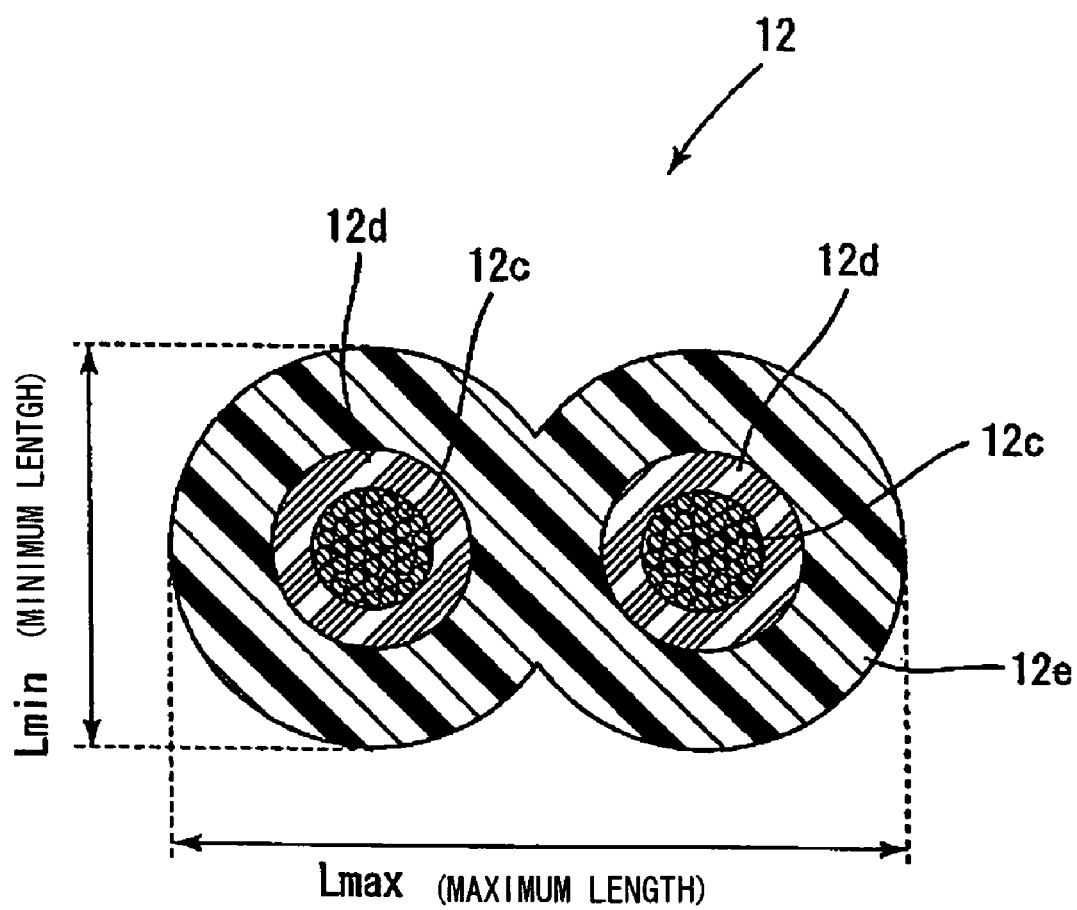
FIG. 2 is a cross sectional view of a power cord.

FIG. 2 shows a cross section of the power cord 12 which is a flat cable as defined by JIS (Japanese Industrial Standards) C3005, namely, a polyvinyl chloride insulated wire for electric equipment where two conducting wires 12c are coated with respective insulators 12d which are covered by a sheath 12e. The cross section of the power cord 12 is noncircular (in the present embodiment, a shape such that two circles are partly overlapped, as shown in FIG. 2), and has a maximum dimension in the left-right direction and has a minimum dimension in the vertical direction, as seen in FIG. 2. The maximum dimension or length of the cross section is represented by Lmax, while the minimum dimension or length is represented by Lmin. A plug 12b of the power cord 12 is inserted in a household 100V power outlet (not shown) so that an electric power is supplied to the TV 10 via the conducting wires 12c.

The DVD player 20 is constructed such that a cabinet 21 (as a main body) made of a metal accommodates various internal devices including a DVD drive mechanism (not shown) and a board, and others. A control circuit mounted on the board operates to control relevant devices to read recorded signals from a DVD and to output video and audio signals in predetermined formats to the TV 10. In this regard, the DVD player 20 and the TV 10 are connected to each other with an AV cable (not shown), and the video and audio signals outputted from the DVD player 20 are inputted into the TV 10 through the AV cable.

Figure 3:
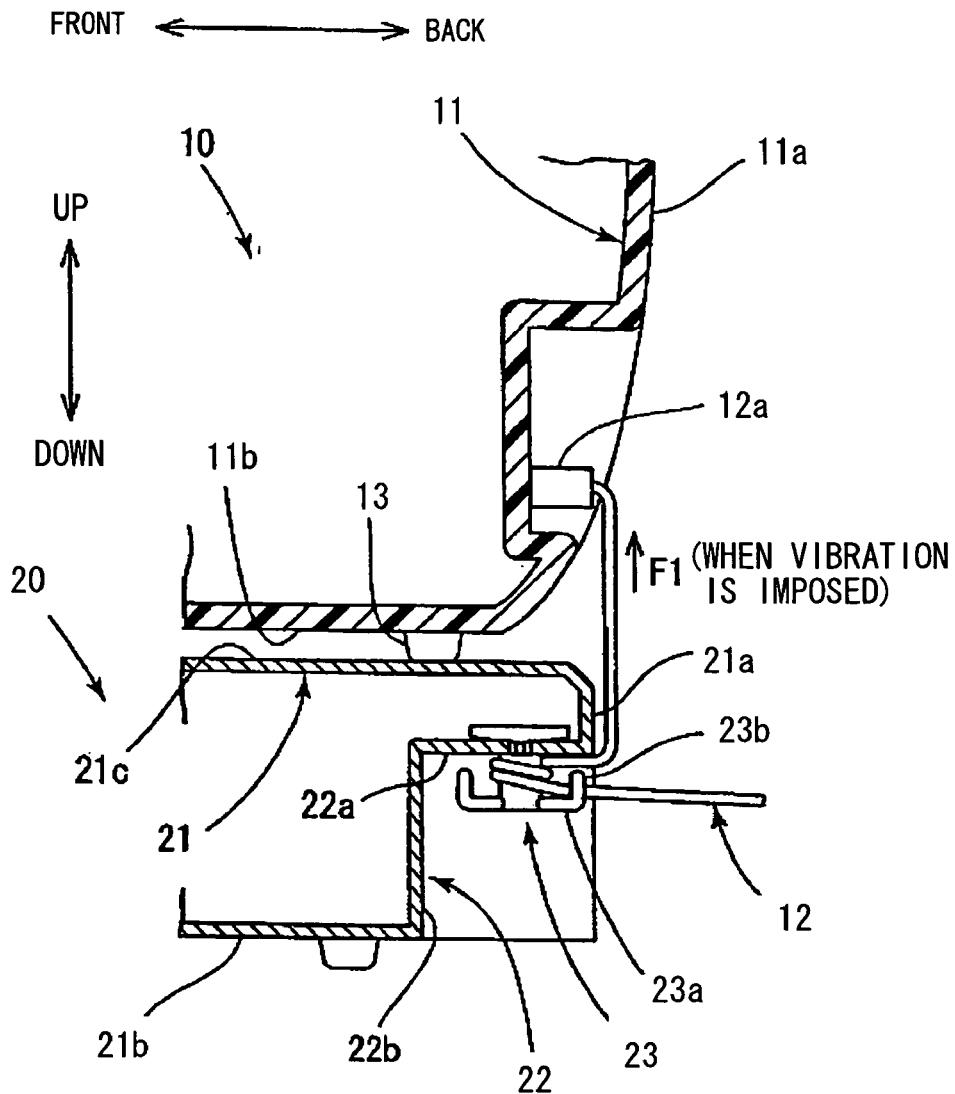
FIG. 3 is a vertical sectional view of the DVD viewing system as seen from the point A1 in FIG. 1.
Figure 3:
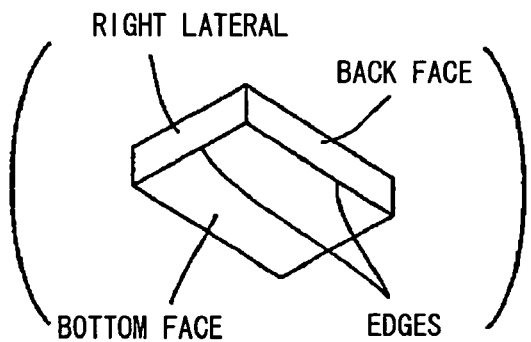
Figure 4:
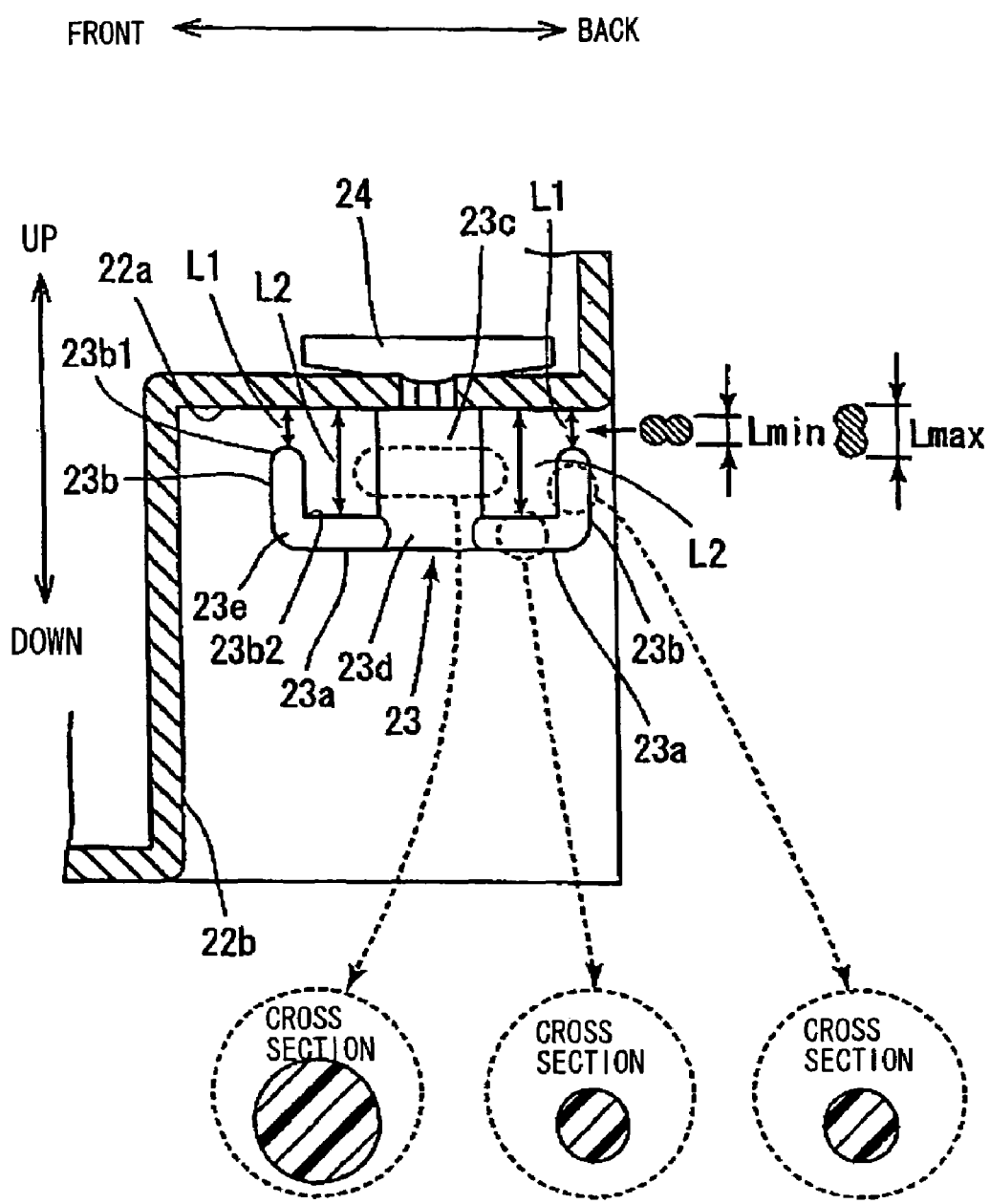
FIG. 4 is a vertical sectional view showing in enlargement a hook member and its vicinity as shown in FIG. 3.

FIG. 3 is a vertical sectional view as seen from point A1 in FIG. 1 and as taken along a line drawn on the immediately near side of the equipment end of the power cord 12 in a state where the power cord 12 is wound around a hook member 23 which is detachably fixed to the cabinet 21. FIG. 4 is a vertical sectional view showing in enlargement a hook members 23 with its vicinity as shown in FIG. 3, in a state where the power cord 12 is not wound around the hook member 23. To facilitate comprehension, members in the background are partly omitted.

As shown in FIG. 3, a top face of the cabinet 21 of the DVD player 20 constitutes a predetermined mounting surface 21c on which the TV 10 is mounted. Four rubber legs 13 (only one of which is shown in FIG. 3) are fixed to, and protruding downward (substantially downward) from, a bottom face 11b of the TV 10. The four legs 13 are placed on the mounting surface 21c of the DVD player 20.

The cabinet 21 of the DVD player 20 has a recessed portion 22 (as a part of the main body) like a partly removed portion, on an edge formed by a bottom face 21b and a back face 21a as one of side faces of the DVD player 20. The term "edge" refers to a line formed where two planes intersect with each other, as schematically shown in the lower side of FIG. 3. Each of the two planes may not necessarily be a plane in the strict sense, but may be a surface which is virtually a plane. The recessed portion 22 has a horizontal surface 22a which is parallel (substantially parallel) to the bottom face 21b of the cabinet 21, and a vertical surface 22b which is parallel (substantially parallel) to the back face 21a of the cabinet 21.

The hook member 23 is made of a resin and detachably fixed to the horizontal surface 22a of the recessed portion 22 to be fixed there. The hook member 23 as fixed to the recessed portion extends from the horizontal surface 22a downward (substantially downward), such that the power cord 12 can be securely wound around the hook member 23. The power cord 12 of the TV 10 is securely wound around the hook member 23, and the TV 10 mounted on the DVD player 20 is thereby fixed to the DVD player 20. Thus, the TV 10 is prevented from falling down when a vibration is imposed thereon, for instance, in the event of an earthquake.

Figure 5:
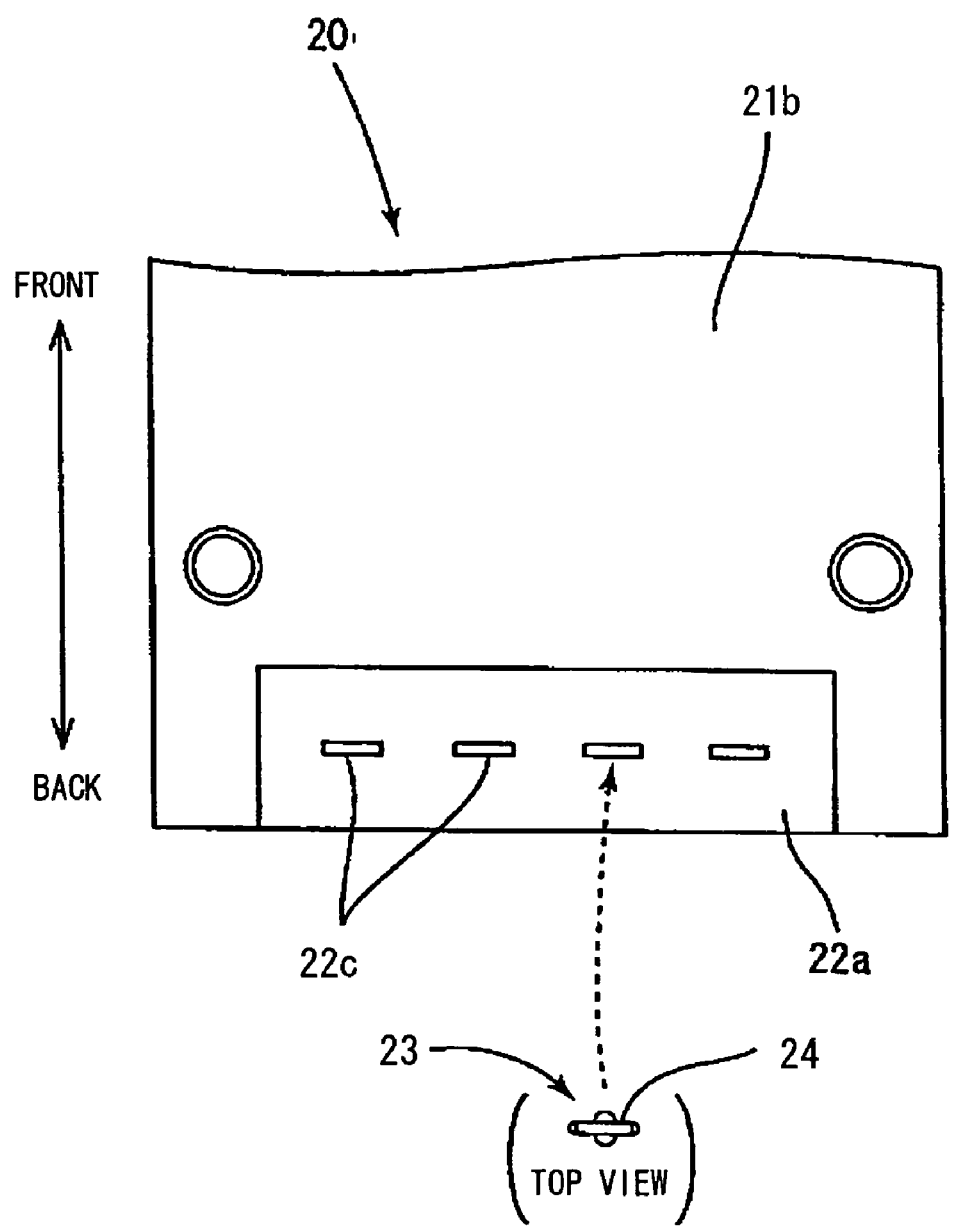
FIG. 5 is a bottom view showing the relevant portion of a DVD player.

FIG. 5 is a bottom view showing the relevant portion of the DVD player 20. In the horizontal surface 22a of the recessed portion is provided a plurality of fixing bores 22c which are arranged in a row extending in the left-right direction, correspondingly to a row of a plurality of attaching places at any of which the hook member 23 can be fixed. In the present embodiment, there are provided four of such fixing bores 22c, each having a rectangular shape with its longer side oriented in the left-right direction.

Figure 6:
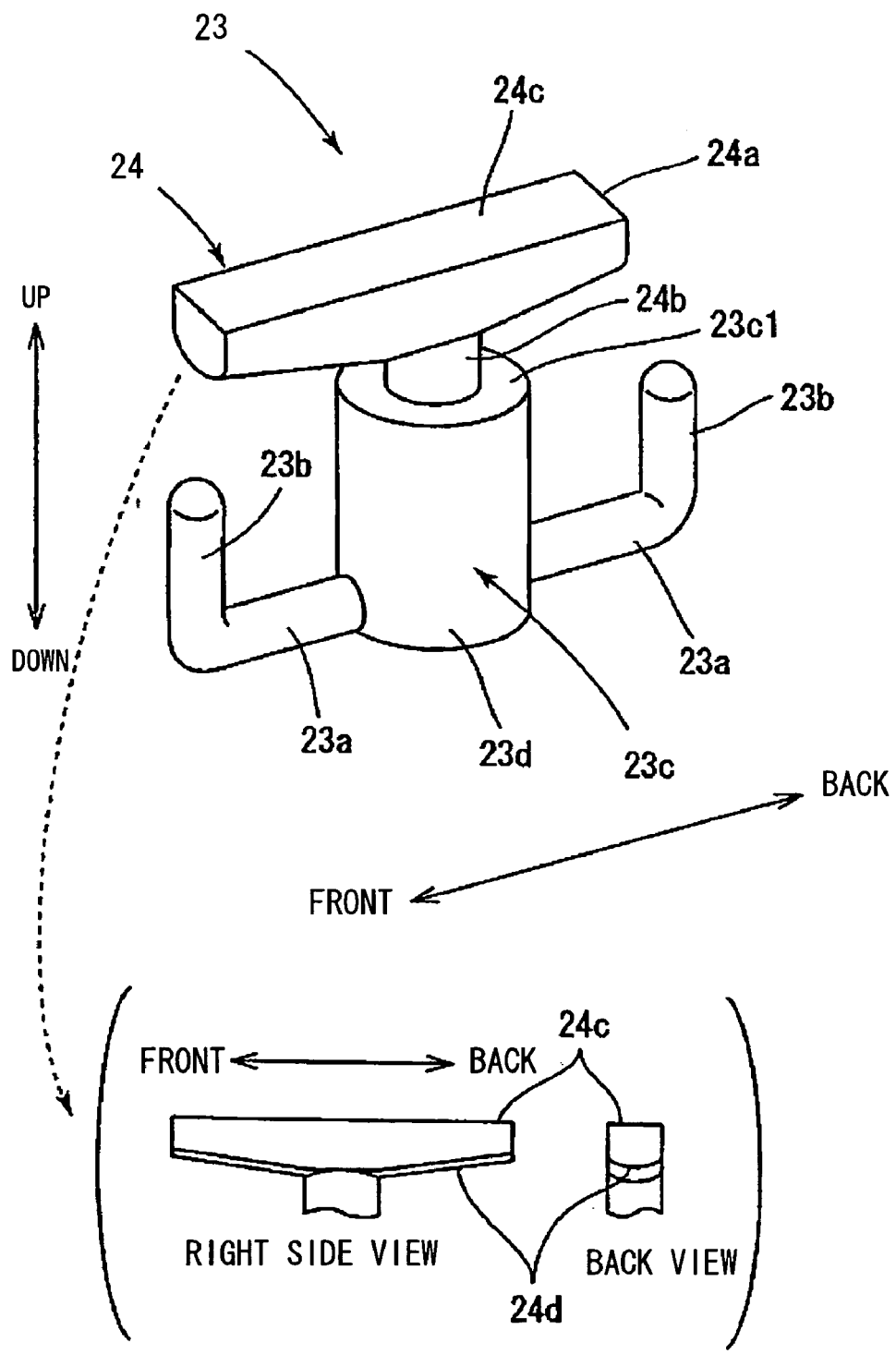
FIG. 6 is a perspective view showing the figure of the hook member.

As shown in the perspective view of FIG. 6 illustrating the hook member 23 in the state fixed to the recessed portion, the hook member 23 has a bore insert portion 24 insertable into one of the fixing bores 22c. The bore insert portion 24 has a lock bar 24a which is configured to be oriented in the front-back direction when the hook member 23 is fixed to the recessed portion, and a cylindrical connecting portion 24b which connects an upper end 23c1 of a main portion 23c of the hook member 23 and a lower end of the lock bar 24a. Atop surface 24c of the lock bar 24a is a planar surface having a rectangular shape slightly smaller than that of the fixing bore 22c, so that the lock bar 24a can be inserted from the under side through the fixing bore 22c. A diameter of the connecting portion 24b is slightly smaller than a width, or a length of a shorter side, of the fixing bore 22c. The main portion 23c of the hook member has a cylindrical shape having a diameter larger than the width of the fixing bore 22c. Hence, the upper end 23c1 of the main body 23c can not get through the fixing bore 22c and is held in contact with the horizontal surface 22a of the recessed portion. In this state, a portion of an under surface 24d of the lock bar 24a is located slightly below an upper surface 22a1 which is the surface of a member constituting the ceiling of the recessed portion (under surface of which ceiling constitutes the horizontal surface 22a) opposite to the horizontal surface 22a.

Figure 7:
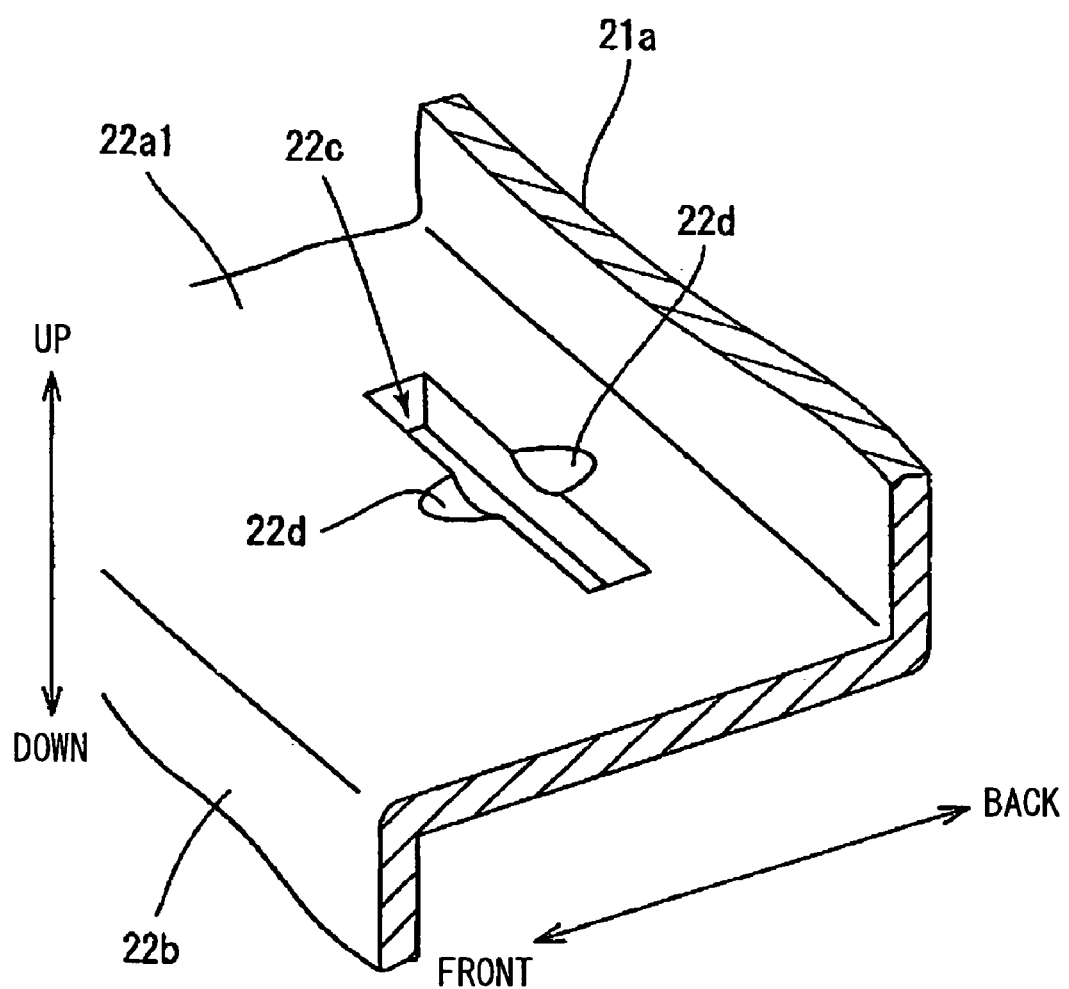
FIG. 7 is a perspective view showing a fixing bore as seen from the upper side.

FIG. 7 is a perspective view showing one of the fixing bores 22c as seen from the upper side. As shown in this figure, the fixing bore 22c is formed through the thickness of the member having the upper surface 22a1 and the horizontal surface 22a on its opposite surfaces (which member will be referred to as "ceiling member" hereinafter). In the upper surface 22a1 and at respective positions adjacent to the front-back direction to the fixing bore 22c in the middle of the longer side (extending in the left-right direction) of the fixing bore 22c, there are formed a pair of dents 22d each having a gently curved semielliptic surface whose major axis extends in the front-back direction.

As shown in its right side view in the lower side of FIG. 6, the lock bar 24a has a tapered shape such that the dimension of the lock bar 24a in the vertical direction gradually decreases frontward and backward from its central portion. Further, as shown in the back view in the lower side of FIG. 6, the under surface 24d of the lock bar 24a is curved such that the central portion of the under surface 24d in the left-right direction is gradually raised downward. The bore insert portion 24 is inserted from the downside into the fixing bore 22c, and is turned 90-degree with the insert portion 24 being flexibly deformed, so that the under surface 24d of the lock bar 24a is fitted in the pair of dents 22d. Thus, the hook member 23 is attached at one of the plurality of attaching places where the fixing bores 22c are provided to be fixed there. By turning 90-degree the lock bar 24a of the bore insert portion 24 of the fixed hook member 23, the insert portion 24 becomes able to be pulled down through the fixing bore 22c, so that the hook member 23 is detached from the recessed portion. In this manner, the hook member 23 can be detachably fixed to the recessed portion at one of the plurality of attaching places corresponding to the plurality of fixing bores 22c, making it possible to change the position in the recessed portion at which the hook member 23 is fixed.

The hook member 23 has a pair of extensions 23a which extend from a lower end 23d of the hook member 23 in a direction different from the direction in which the hook member 23 extends from the horizontal surface 22a in the state where the hook member is fixed to the recessed portion. The extensions 23a serve to prevent the power cord 12 from falling off, and in the present embodiment one of the extensions 23a extends horizontally (substantially horizontally) and frontward, while the other extension 23a extends horizontally (substantially horizontally) and backward. In other words, the extensions 23a horizontally (substantially horizontally) extend from the lower end 23d in respective directions which are opposite (substantially opposite) to each other. According to this arrangement, when the power cord 12 wound around the hook member 23 moves downward, the power cord 12 is eventually brought into contact with the extensions 23a which extend in the respective directions different from the downward extending direction of the hook member 23, and made unable to move down any further. Thus, the extensions 23a prevent the power cord 12 wound around the hook member 23 from falling off. Therefore, the power cord 12 is inhibited from coming off the hook member 23, thereby enabling the TV 10 to be fixed to the DVD player 20 with reliability.

Further, each extension 23a has a prong 23b which extends upward (substantially upward) from an end 23e of the each extension 23a. That is, when the power cord 12 wound around the hook member 23 moves toward any of the prongs 23b, the power cord 12 is eventually brought into contact with the prong 23b and made unable to move any further. Thus, the prongs 23b also serve to prevent the power cord 12 wound around the hook member 23 from falling down, inhibiting the power cord 12 from coming off the hook member 23. Consequently, the TV 10 can be fixed to the DVD player 20 with reliability.

An interval L1 in the vertical direction (substantially vertical direction) between an upper end 23b1 of the prong 23b and the horizontal surface 22a of the recessed portion 22 is smaller than a maximum dimension or length Lmax of the cross section of the power cord 12, as well as larger than a minimum dimension or length Lmin of the cross section of the power cord 12. Therefore, when the TV 10 is mounted on the DVD player 20, the power cord 12 is inserted from the interval L1 between the prong 23b and the horizontal surface 22a of the recessed portion 22, with the power cord 12 held in an orientation where the minimum dimension of the power cord 12 is oriented in the vertical direction, into an interval L2 between the extension 23a and the horizontal surface 22a of the recessed portion 22.

Since the hook member 23 is made of a resin and thus flexible to some extent, the power cord 12 may be inserted into the interval L2 between the extension 23a and the horizontal surface 22a with and by being flexibly deformed through the interval L1.

A length of the interval L2 in the vertical direction (substantially vertical direction) between the extension 23a or a lower end 23b2 of the prong 23b and the horizontal surface 22a of the recessed portion 22 is larger than the maximum dimension or length Lmax of the cross section of the power cord 12. After the power cord 12 is inserted into the interval L2 between the extension 23a and the horizontal surface 22a, the direction of the side of the power cord 12 having the maximum dimension is oriented vertically, so as to make the power cord 12 unable to come through the interval L1 between the prong 23b and the horizontal surface 22a. Thus, the power cord 12 is inhibited from coming off from the hook member 23.

Figure 8:
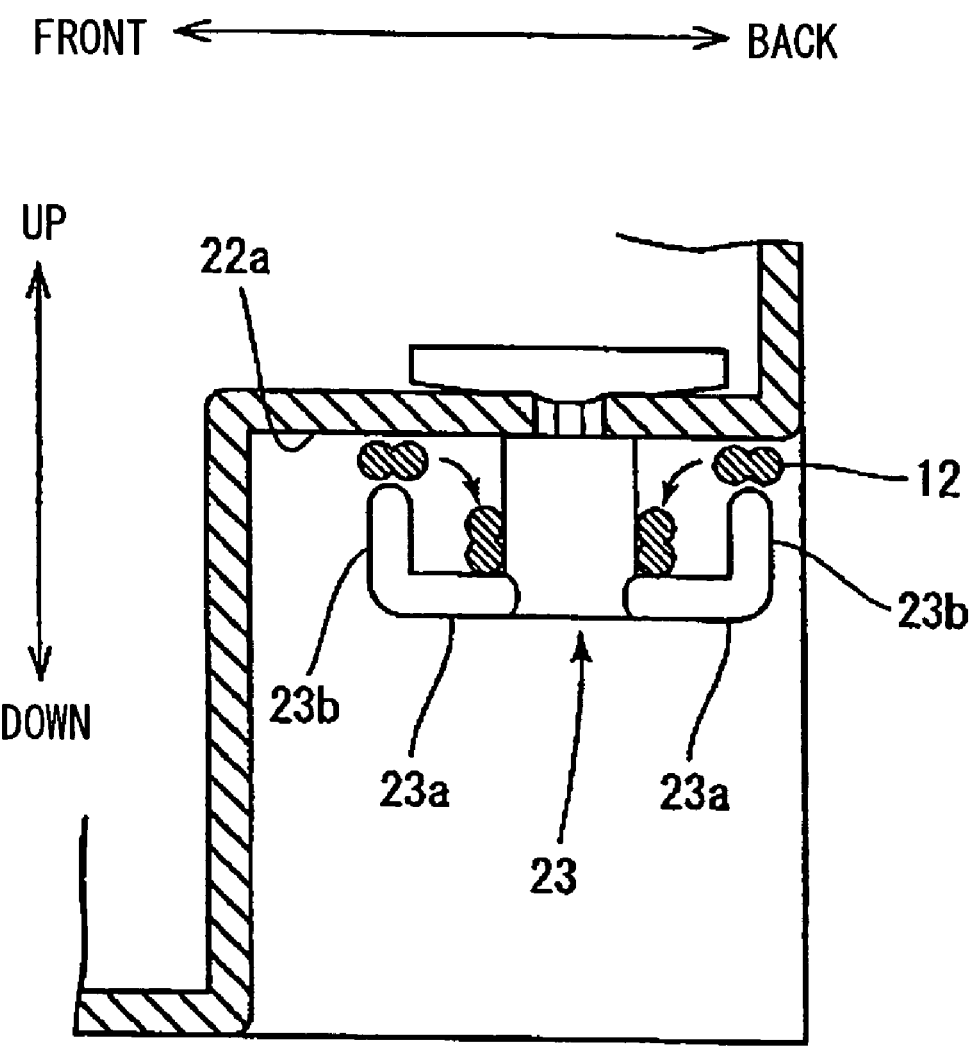
FIG. 8 is a schematic view illustrating how the power cord is wound around the hook member.

To have the power cord 12 securely wound around the hook member 23 to be locked there, the power cord 12 is entwined around the hook member 23 by being sequentially and repeatedly inserted from one and the other of the two intervals L1, while the orientation of the power cord 12 being varied appropriately, as shown in FIG. 8.

Thus, the TV 10 is fixed to the DVD player 20 by securely winding the power cord 12 around the hook member 23 such that the power cord 12 is inserted from the interval L1 and into the interval L2.

The number of turns of the power cord 12 may be any, as long as the power cord 12 can be inserted between the prong 23b and the horizontal surface 22a of the recessed portion 22. The power cord 12 may be wound with only one turn around the hook member 23, or, wound with several turns until the power cord 12 comes to unable to be inserted deep into the interval L2 any more and thus remains in the interval L1.

(2) Operation of the TV Fixing Structure

Initially, how the hook member 23 is fixed to the main body 21 of the DVD player will be described.

Figure 9:
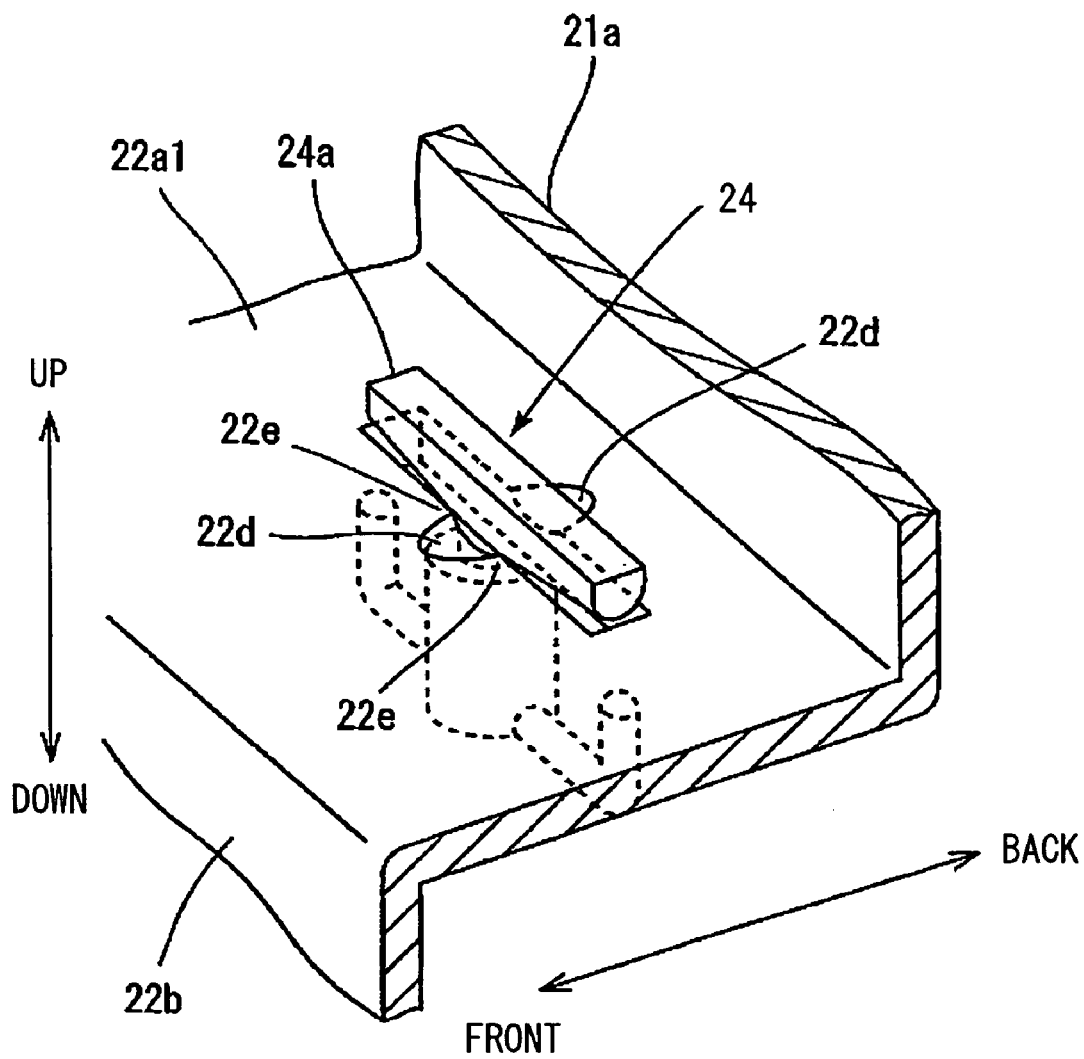
FIG. 9 is a perspective view illustrating the state where a bore insert portion is inserted through the fixing bore.
Figure 9:
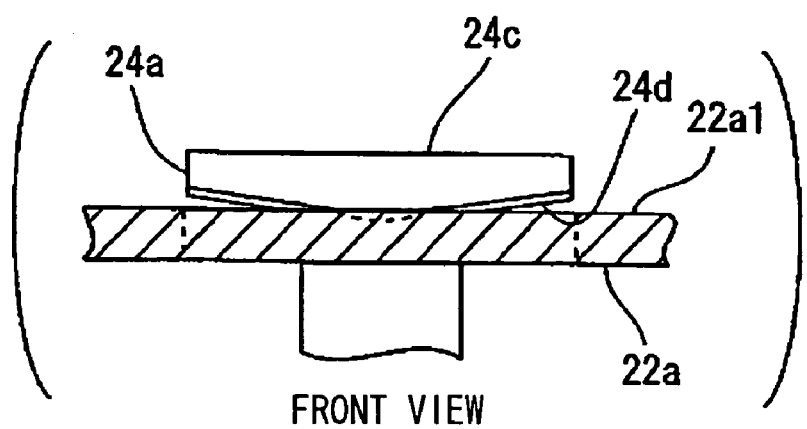

First, a longer side of the top surface 24c of the bore insert portion 24 is aligned with a longer side of desired one of the fixing bores 22c, and the insert portion 24 is inserted into the one fixing bore 22c from the under side. More specifically, the extensions 23a are oriented in the left-right direction with the lock bar 24a also oriented in the left-right direction, as shown in FIG. 6, and the lock bar 24a oriented in such a direction is inserted into the fixing bore 22c shown in FIG. 7. Thus, the bore insert portion 24 gets through the fixing bore 22c, as seen in FIG. 9. In this state, the under surface 24d of the lock bar 24a is located slightly below the upper surface 22a1 of the ceiling member, as shown in the front elevational view in the lower side of FIG. 9.

Figure 10:
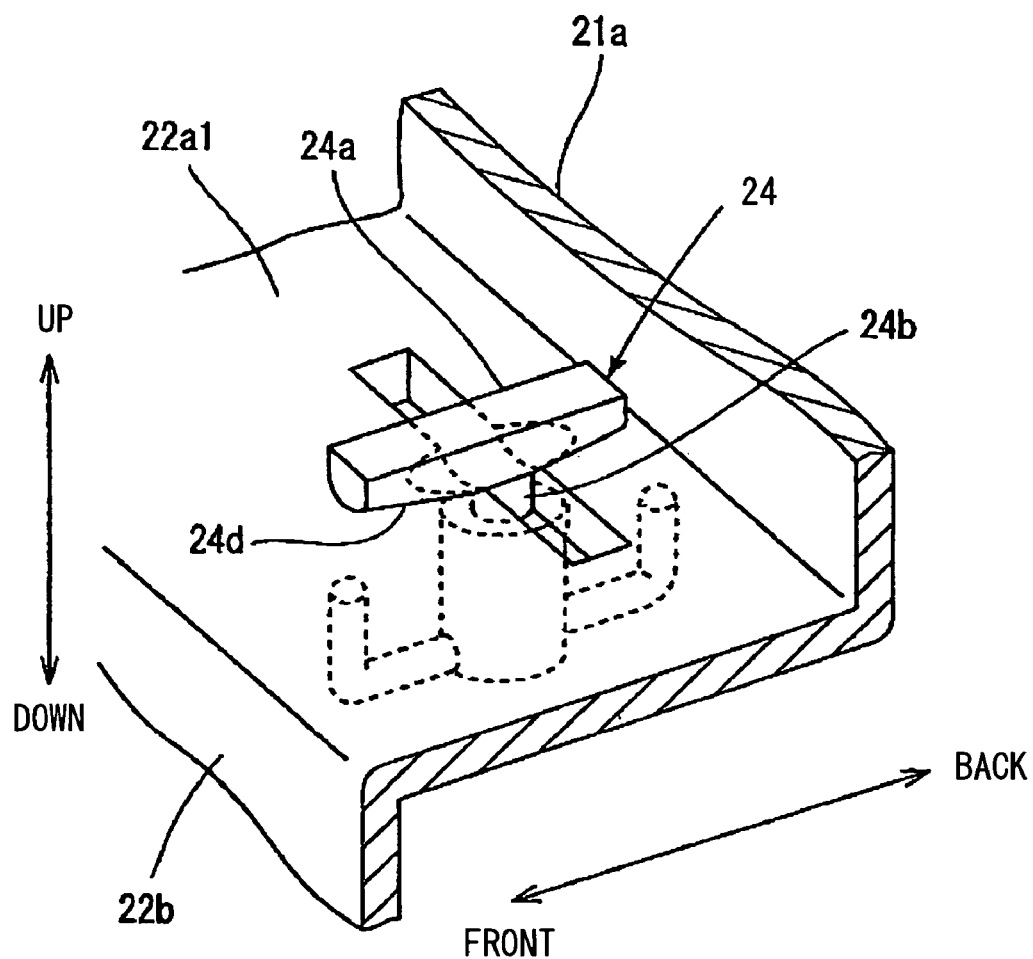
FIG. 10 is a perspective view illustrating the state where the hook member is turned 90-degree from the state shown in FIG. 9.

Subsequently, the extensions 23a are clockwise or counterclockwise turned 90-degree around an axis extending along the centerline of the main portion 23c so as to be oriented in the front-back direction. During the extensions 23a are being turned, the under surface 24d of the lock bar 24a is held in sliding and pressing contact with a periphery 22e of the dents 22d with the lock bar 24a being flexibly deformed by the pressing force. The lock bar 24a is thus turned 90-degree, or until the under surface 24d thereof reaches the dents 22d and is fitted therein, as shown in FIG. 10. In this state, the lock bar 24a is oriented in the front-back direction. It is noted that the hook member 23 is configured such that the connecting portion 24b can be rotated 90-degree in the fixing bore 22c.

The hook member 23 is fixed to one of the plurality of attaching places respectively corresponding to the plurality of fixing bores 22c, by inserting the bore insert portion 24 of the hook member 23 into the one fixing bore 22c and turning the insert portion 24 there, as described above. Thus, according to the present embodiment, it is made possible to fix the hook member to one of the fixing bores provided to the DVD player by a simple manipulation that the bore insert portion of the hook member is inserted into the one fixing bore and turned there.

On the other hand, when the hook member 23 is detached from the recessed portion 22 so as to change the attaching place, the extensions 23a of the fixed hook member is turned clockwise or counterclockwise 90-degree to be oriented in the left-right direction. During this turning, the under surface 24d of the lock bar 24a is held in sliding and pressing contact with the periphery 22e of the dents 22d with the lock bar 24a being flexibly deformed by the pressing force. When the lock bar 24a has been turned 90-degree, the longer side of the top surface 24c of the bore insert portion 24 is aligned with the longer side of the fixing bore 22c, as shown in FIG. 9, in which state the bore insert portion 24 can be pulled down through the fixing bore 22c. The hook member detached from the recessed portion 22 is renewedly attached to another fixing bore 22c as desired, by inserting the bore insert portion 24 into the desired fixing bore 22c and turning the insert portion 24 there.

Figure 11:
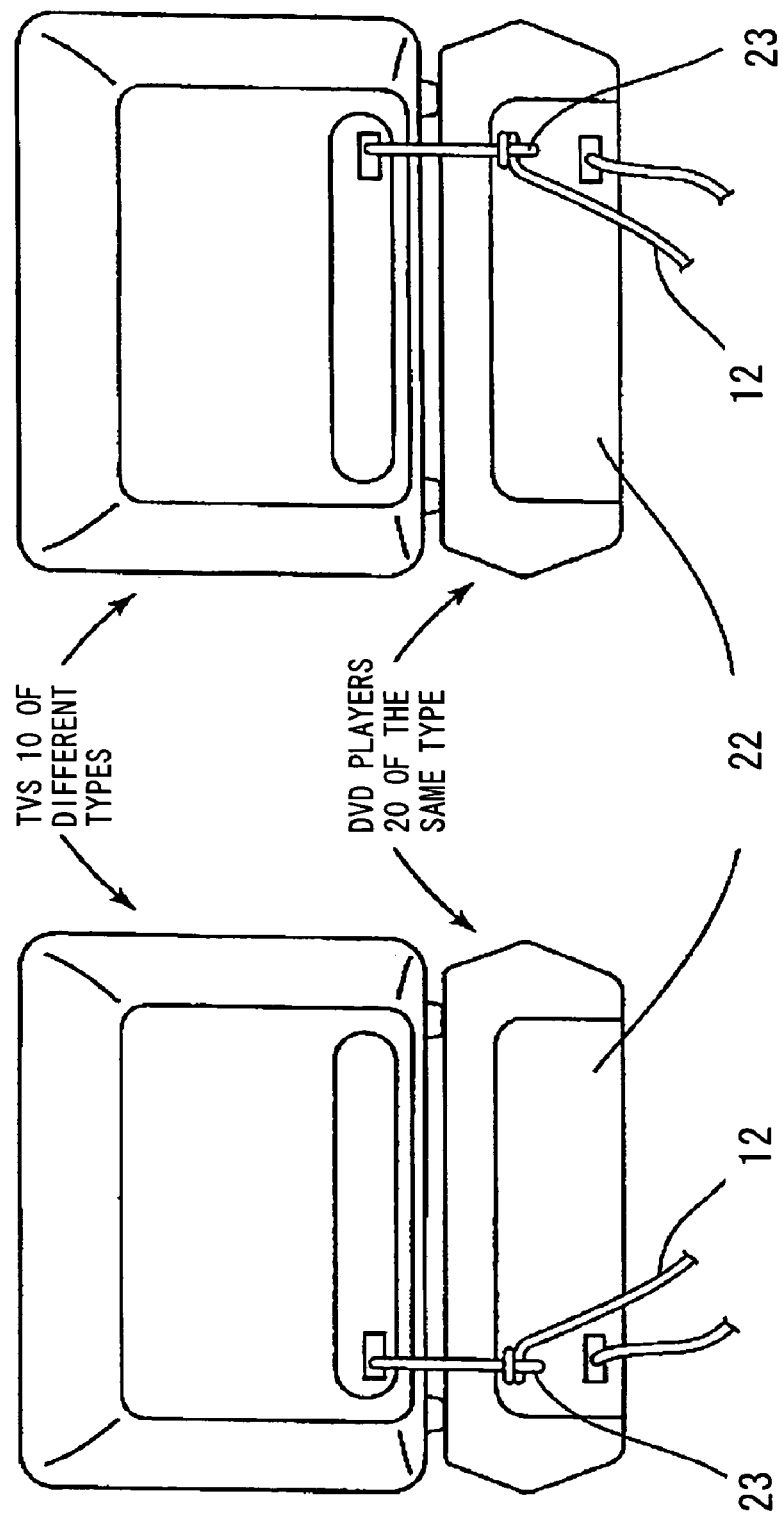
FIG. 11 is a back view showing two kinds of televisions mounted on the same kind of DVD player, in which a power cord of each television is wound around the hook member.

The hook member 23 is thus configured to be detachably fixed to the recessed portion 22, with the fixing position being changeable.

Where a TV 10, whose power-cord attaching position (where the equipment end of the power cord 12 is attached) is provided on the left-hand side in the back face 11a of its cabinet, is mounted on the DVD player 20, the hook member, whose fixing position with respect to the recessed portion 22 of the DVD player 20 is changeable, is fixed to the left-hand side of the recessed portion 22, as shown in FIG. 11. The relative position between the power cord 12 of the TV 10 and the hook member 23 is thus suitably adjusted for winding the power cord 12 around the hook member 23 so as to fix the TV 10 to the DVD player 20.

As described above, the fixing structure according to the present embodiment where the hook member 23 is changeable in regard to its fixing position relative to the recessed portion 22 facilitates winding, around the hook member 23, the power cord 12 of various kinds of TVs 10 having respective power-cord attaching positions, by locating the hook member 23 at a position convenient for the winding the power cord 12.

There will be now described how TV 10 is fixed to the DVD player 20 by winding the power cord 12 around the hook member 23 as fixed in position.

As described above, by winding the power cord 12 around the hook member 23 while TV 10 is mounted on the mounting surface 21c of the DVD player 20, the power cord 12 is locked around the hook member 23 to thereby enable the TV 10 to be fixed to the DVD player 20. The thus utilizing the power cord of the TV facilitates fixing the TV to the DVD player, omitting an additional member such as a belt, band, buckle or hook-shaped bracket.

As described above, in the case where a vibration such as that by an earthquake is imposed on the DVD viewing system 100, a force causing the TV 10 on the DVD player 20 to fall frontward is imposed on the TV 10, since the center of gravity of the TV 10 is located on its front side. Then, an upward tensile force F1 as indicated in FIG. 3 is applied to the power cord 12 fixing the TV 10 to the DVD player 20. The power cord 12 which is wound around the hook member 23 of the DVD player 20 does not move upward even when such an upward force F1 is applied. Consequently, the TV 10 does not fall frontward but is held fixed to, and mounted on the upper surface of, the DVD player 20.

Even in a case where a horizontal force is imposed on the TV 10, the TV 10 substantially does not slip sideways, since the power cord 12 of the TV 10 is wound around the hook member 23 of the DVD player 20 with the power cord 12 and the hook member 23 appropriately positioned relatively to each other. This also contributes to prevent the TV 10 from falling down from the DVD player 20.

The-power cord 12 has the equipment end 12a which is made of a resin and has a strength such that the equipment end 12a can bear a given load in a tensile test, e.g., such that the main body of the TV 10 can be suspended by the power cord 12, and is fixedly attached to the back face 11a of the cabinet 11. Hence, even if a vibration such as an earthquake is imposed on the TV 10, the power cord 12 is not easily cut off or plucked away from the main body of the TV 10.

As described above, the TV fixing structure according to the present embodiment eliminates the necessity of preparing an additional member such as a belt, band, buckle or hook-shaped bracket, by utilizing the power cord of the TV for fixing the TV. Further, since the fixing position of the hook member with respect to the recessed portion of the electrical apparatus as the mounting body is changeable, it is made possible to wind the power cord of various kinds of TVs having respective power-cord attaching positions, around the hook member which is located at a position convenient for the winding the power cord. Thus, the TV fixing structure is convenient and eliminates the necessity of preparing the additional member such as a belt, while enabling the various kinds of TVs to be easily and securely fixed to the electrical apparatus as the mounting body. Consequently, the TV can be prevented from falling down in the event of an accident such as an earthquake.

Further, since the hook member 23 extend downward (substantially downward) away from the TV 10 mounted on the electrical apparatus as the mounting body, the power cord 12 does not easily come off from the hook member 23, enabling the TV 10 to be fixed to the electrical apparatus with reliability.

(3) Other Embodiments

There will be described several TV fixing structures according to other embodiments of the present invention.

The mounting body on which the TV is mounted is not limited to a DVD player, but maybe other electrical apparatuses such as a video cassette recorder, or objects other than electrical apparatuses, e.g., a stand such as a TV stand on which the TV 10 can be mounted. On the other hand, the electrical apparatus which is mounted on the mounting body is not limited to a TV, but may be a DVD player, video cassette recorder, etc. Where a structure for fixing these electrical apparatuses is provided, a power cord of an electrical apparatus mounted on another electrical apparatus as a mounting body is utilized for easily fixing the electrical apparatus to the another electrical apparatus, eliminating the necessity of preparing an additional member such as a belt.

Since a DVD player also has a power cord extending from its cabinet, a DVD and a TV maybe fixed to each other by utilizing the power cord of the DVD, as in a second embodiment of the invention.

Figure 12:
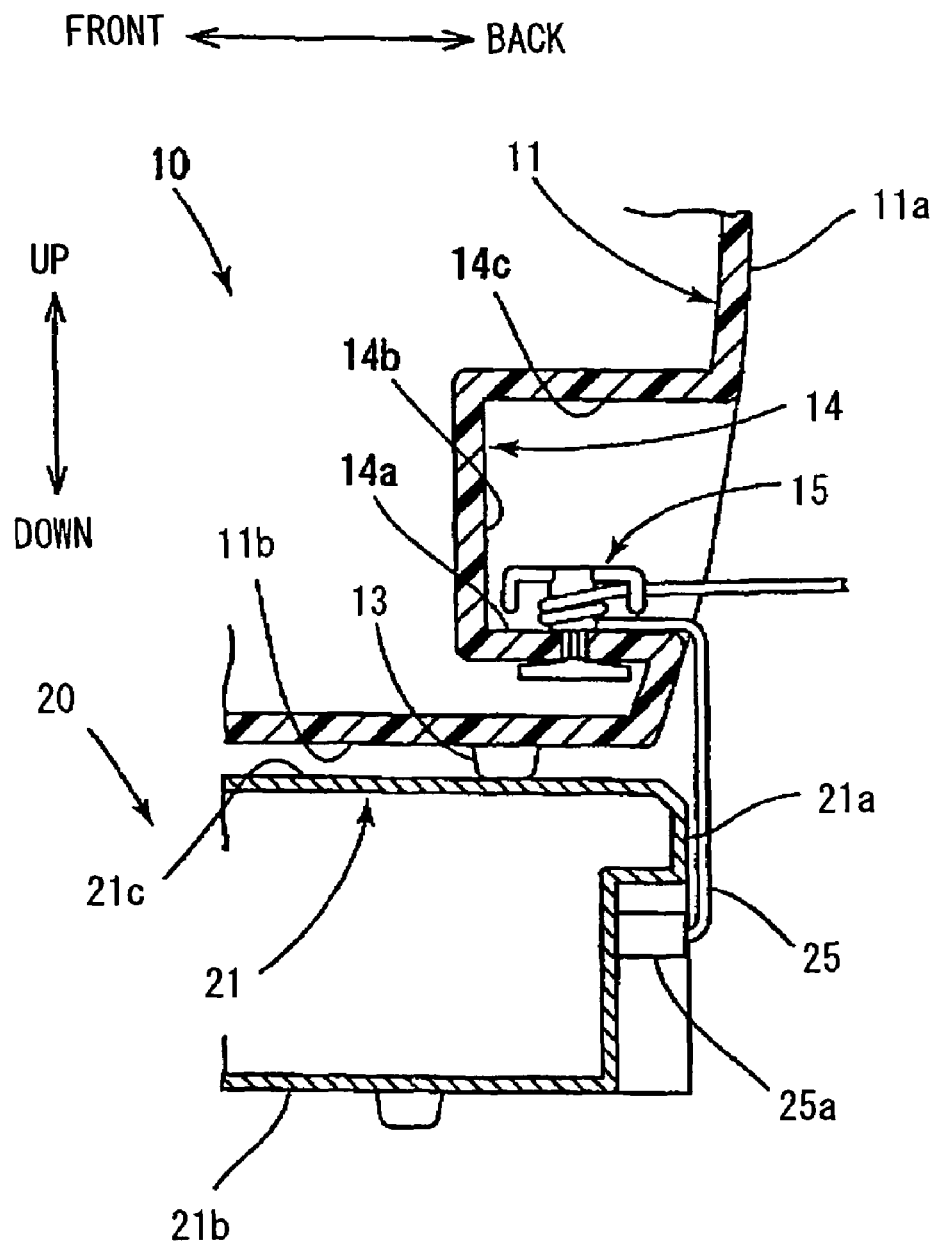
FIG. 12 is a vertical sectional view of a DVD viewing system with a structure for fixing a television according to a second embodiment of the invention.

FIG. 12 is a vertical sectional view showing in cross section a DVD viewing system according to the second embodiment of the invention. The elements similarly constructed to the corresponding elements shown in FIG. 3 are denoted by the same reference numerals and not described here.

As shown in FIG. 12, the DVD player 20 has a power cord (insulated electric wire) 25 extending backward (substantially backward) from the back face 21a of the cabinet 21. An equipment end 25a of the power cord 25 is made of a resin and fixedly attached to the back face 21a of the cabinet 21.

On the other hand, in the back face 11a of the cabinet of the TV 10 as an electrical apparatus mounted on the DVD player 20, there is formed a recessed portion 14 like a hollow dug in the back face 11a in the frontward (substantially frontward) direction. The recessed portion 14 has two horizontal surfaces 14a, 14c, which are parallel (substantially parallel) to the bottom face 11b of the cabinet 11, and a vertical surface 14b which is parallel (substantially parallel) to the back face 11a of the cabinet 11. The horizontal surfaces 14a, 14c are opposed to each other, with the horizontal surface 14a being on the lower side and the horizontal surface 14c being on the upper side.

The recessed portion 14 has a hook member 15 which is made of a resin and which extends from the horizontal surface 14a upward (substantially upward), such that the power cord 25 can be securely wound around the hook member 15. The hook member 15 has a shape identical with that of the hook member 23.

The power cord 25 of the DVD player 20 is securely wound around the hook member 15, by entwining the power cord 25 around the hook member while the orientation of the cross section of the power cord 25 is appropriately and sequentially varied. According to the second embodiment, the power cord 25 of the DVD player is locked around the hook member 15 so as to fix the TV 10 and the DVD player 20 to each other.

As seen from the above description, by utilizing the power cord of the electrical apparatus as the mounting body, the same advantages as those of the first embodiment can be obtained; that is, the TV and various kinds of electrical apparatuses as the mounting body having respective power-cord attaching positions can be easily and securely fixed to each other, without requiring an additional member such as a belt, thereby preventing the TV from falling down in the event of an accident such as an earthquake. In particular, in a case where it is difficult to wind the power cord of a TV around a hook member of an electrical apparatus as the mounting body, the present structure is advantageously employed to securely wind the power cord of the electrical apparatus as the mounting body around the hook member of the TV so that the two electrical apparatuses can be fixed to each other.

It is also feasible to arrange such that the power cord of the TV is wound around the hook member of the DVD player as well as the power cord of the DVD player is wound around the hook member of the TV, to fix the TV and DVD player to each other. According to this arrangement, the two electrical apparatuses are further reliably fixed to each other, enabling to effectively prevent the mounted electrical apparatus from falling down.

The power cord may be replaced by any other insulated electric wire such as an earth cable, antenna wire or signal wire.

There will be described a third embodiment of the invention, according to which the hook member is fixed to the recessed portion in a manner other than the turning the hook member, unlike the first embodiment.

Figure 13:
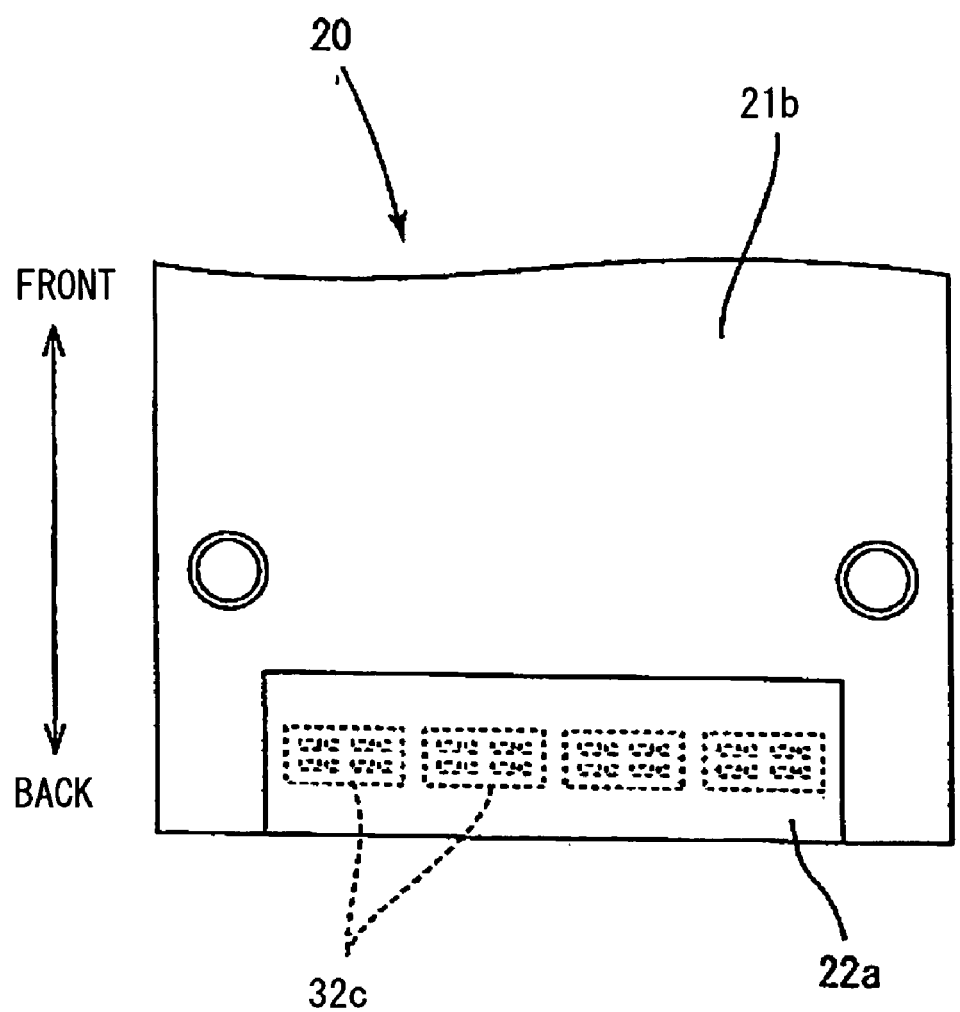
FIG. 13 is a bottom view showing the relevant portion of a DVD player according to a third embodiment of the invention.
Figure 14:
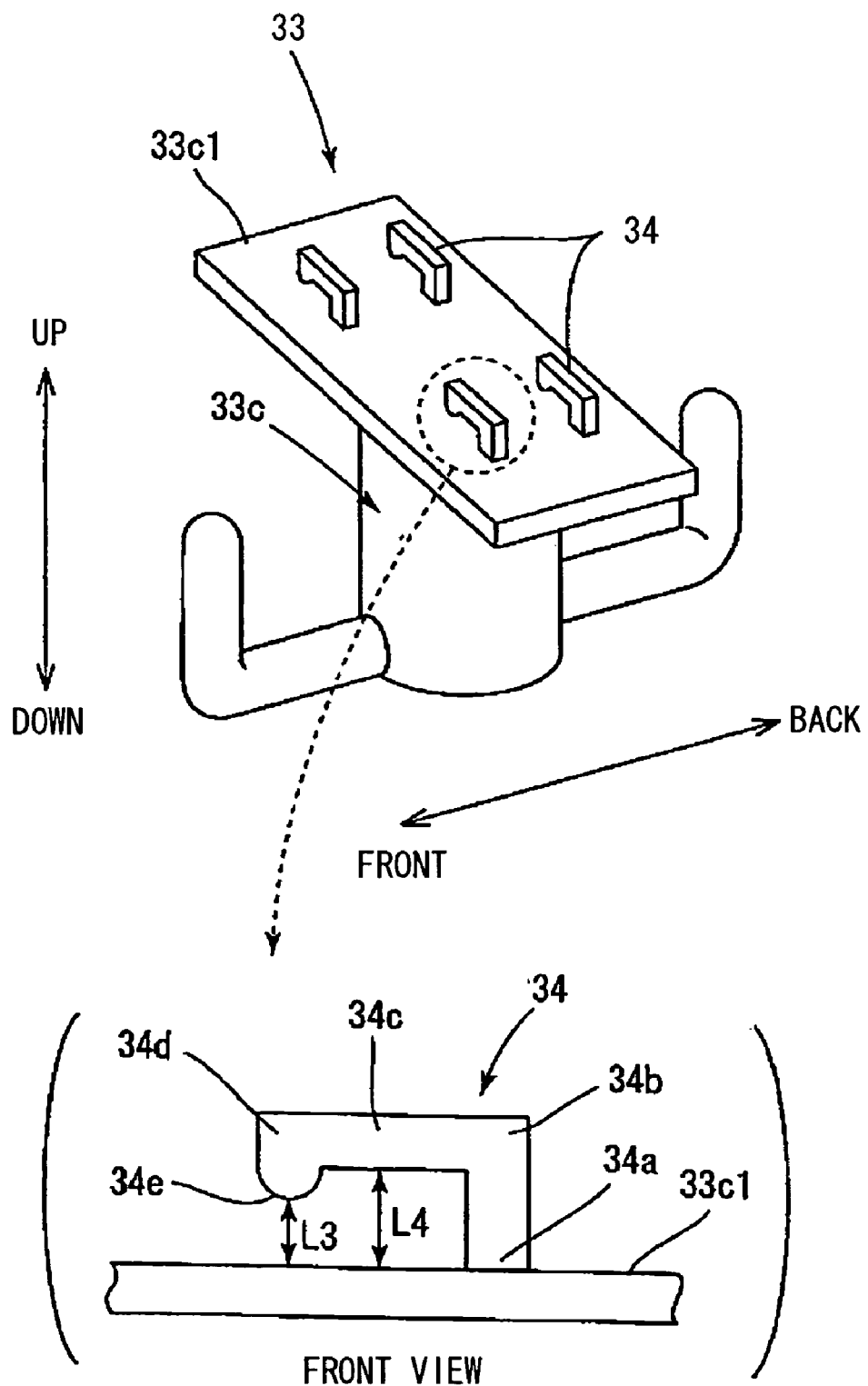
FIG. 14 is a perspective view showing the figure of a hook member according to the third embodiment.

FIG. 13 is a bottom view showing the relevant portion of the DVD player 20 in the DVD viewing system to which is applied a TV fixing structure according to the third embodiment, while FIG. 14 shows the figure of a hook member 33 of the DVD player 20 in a state where the hook member 33 is fixed to the recessed portion of the DVD player 20. The elements similarly constructed to the corresponding elements shown in FIG. 5 are denoted by the same reference numerals and not described here.

As shown in FIG. 13, in a horizontal surface 22a of a recessed portion of a DVD player 20 are formed a plurality of fixing bore sets 32c respectively corresponding to a plurality of attaching places at each of which the hook member 33 can be detachably fixed. The hook member 33 is made of a resin, and has four bore insert portions 34 insertable into any of the fixing bore sets 32c. In the third embodiment, a connecting plate 33c1 having a planar shape is disposed on an upper end of a main portion 33c of the hook member 33. On an upper surface of the connecting plate 33c1 are formed the four insert portions 34, each of which extends upward from a base portion 34a thereof, and then horizontally (leftward as seen from the front side of the system) extends from an upper end 34b of the upward extension to form a horizontal portion 34c, from whose end a protrusion 34e is projected downward. Each protrusion 34e has a semicircular shape shorten in the vertical direction as seen from the front side, and is configured such that when a force of an intensity above a certain level is imposed in the left-right direction upon the protrusion 34e as engaged with a short bore 32e, the protrusion 34e is disengaged therefrom.

A vertical interval L3 between the protrusion 34e and the connecting plate 33c1 is slightly smaller than the thickness of the ceiling member having the upper surface 22a1 and horizontal surface 22a, while a vertical interval L4 between the horizontal portion 34c and the connecting plate 33c1 is slightly larger than the thickness of the ceiling member.

Figure 15:
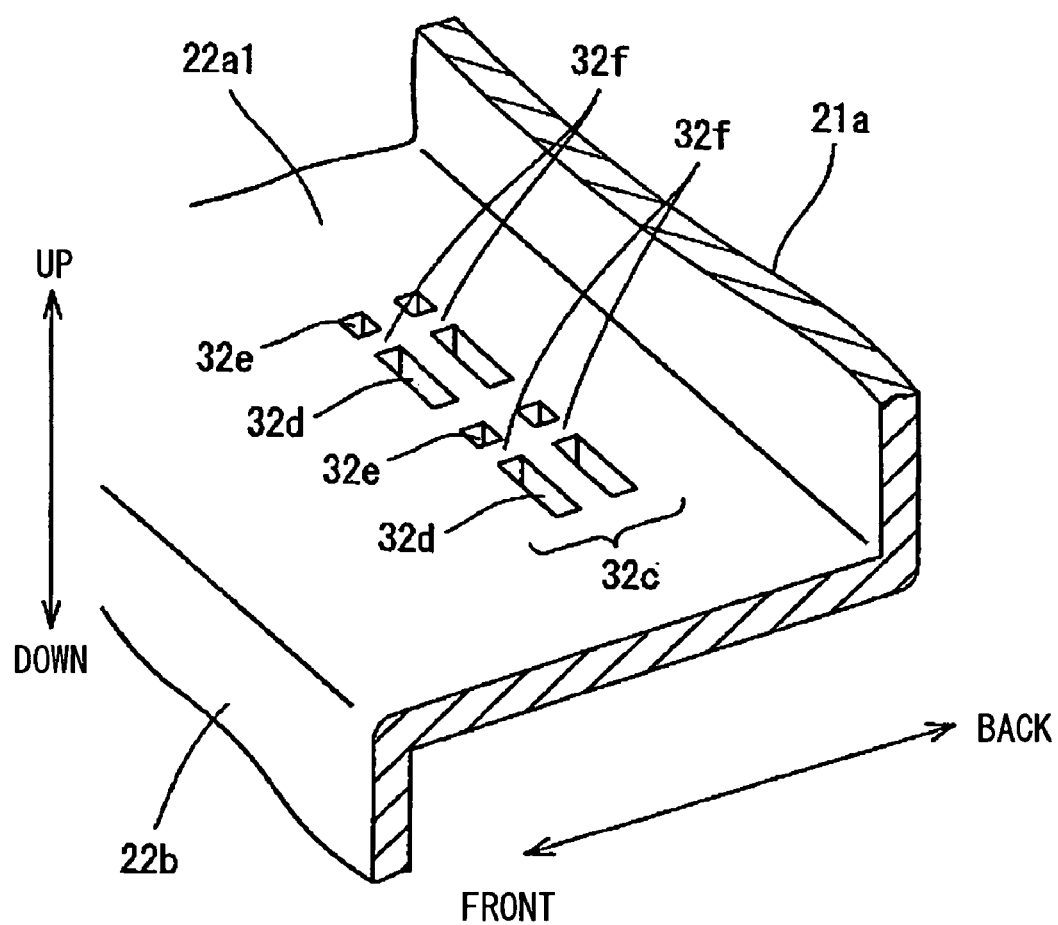
FIG. 15 is a perspective view showing fixing bores as seen from the upper side, according to the third embodiment.

FIG. 15 is a perspective view showing one of the fixing bore sets 32c from the upper side. As can be seen in this figure, the fixing bore set 32c is constituted by four long bores 32d, which are disposed positionally correspondingly to the arrangement of four insert portions 34, and four short bores 32e. Each of the short bores 32e is spaced from one of the long bores 32d in the horizontal direction (leftward direction as seen from the front side of the system) by a distance corresponding to a length of the horizontal portion 34c of the insert portion 34.

The four insert portions 34 configured as described above are inserted into the respective four long bores 32d from the under side, so that the horizontal portions 34c get through the long bores 32d of the fixing bore set 32c. In this state, the under surface of each of the horizontal portion 34c is located slightly above the upper surface 22a1 of the ceiling member, while the lower end of the protrusion 34e is located slightly below the upper surface 22a1.

Subsequently, the bore insert portions 34 are slid in a direction other than the upward direction in which the insert portions 34 are inserted, namely, in the horizontal direction (leftward direction) by application of a force, until the protrusions 34e reach and are respectively fitted in the short bores 32e, during which the lower end of each of the protrusions 34e is held in sliding and pressing contact with each of four intermediate portions 32f respectively defined between the long bores 32d and the short bores 32e, with the each protrusion 34e flexibly deformed by the pressing force. Once the protrusions 34e have been fitted in the respective short bores 32e, the hook member 33 is fixed to the horizontal surface 22a.

As described above, the hook member 33 is fixed to one of the plurality of attaching places corresponding to the plurality of fixing bore sets 32c, by inserting the bore insert portions 34 into one of the fixing bore sets 32c and then sliding the insert portions 34 in a direction other than the direction in which the insert portions 34 are inserted into the fixing bore set 32c. Thus, the hook member can be attached at one of the fixing bore sets and fixed there, by a simple manipulation that the bore insert portions are inserted into one of the fixing bore sets of the DVD player and then slided.

On the other hand, when the hook member 33 is detached from the recessed portion 22, the hook member 33 is slided rightward by application of a force, such that the lower end of each protrusion 34e is held in sliding and pressing contact with the intermediate portion 32f with the protrusion 34e being flexibly deformed by the pressing force. When the protrusions 34e have surmounted the respective intermediate portions 32f, the bore insert portions 34 can be pulled down through the long bores 32d or fixing bore set 32c. Thus, the hook member 33 is changeable in regard to its fixing position at which the hook member 33 is detachably fixed to the recessed portion.

Figure 16:
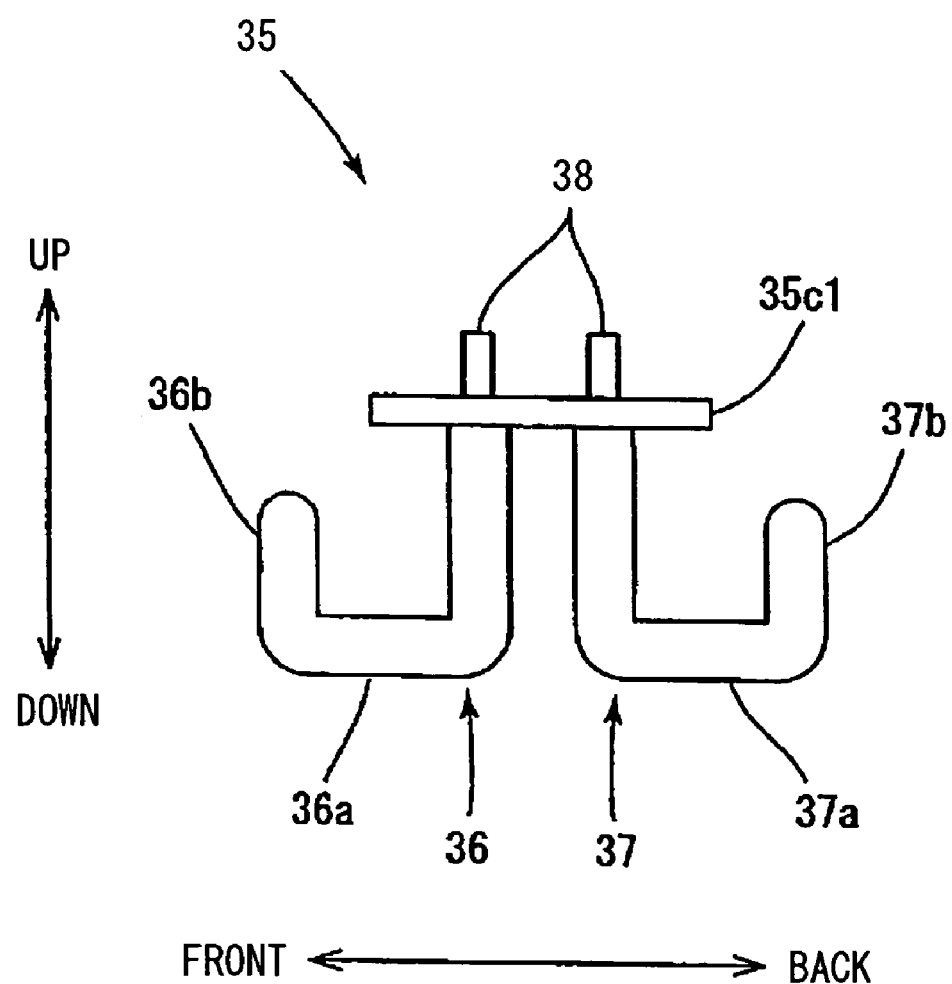
FIG. 16 is a right side view of a hook member according to a fourth embodiment of the invention.

According to a fourth embodiment of the invention, a hook member 35 made of a resin has a pair of bore insert portions 38, a connecting plate 35c1, and a pair of hook parts 36, 37 which extend downward from the connecting plate 35c1 such that a power cord can be wound around the pair of hook parts 36, 37 to be locked there, as shown in FIG. 16. The pair of hook parts 36, 37 is configured such that each hook part 36, 37 has a horizontal extension 36a, 37a extending substantially horizontally from the lower end of the vertically extending portion of the each hook part 36, 37 which extends downward from the connecting plate 35c1, so that the pair of horizontal extensions 36a, 37a extend substantially opposite directions to each other and prevent the power cord wound around the vertically extending portions from falling off. From the end of the each horizontal extension 36a, 37a, a prong 36b, 37b extends substantially upward. Since the hook member 35 is made of a resin, a distance between the vertically extending portions of the hook parts 36, 37 is slightly decreased when the power cord is firmly wound around the parts 36, 37, and a force to restore the shape of, or distance between, the parts 36, 37 is generated. Thus the power cord wound around the parts 36, 37 is prevented from loosening, thereby further effectively inhibiting the power cord from coming off the hook member.

According to a fifth embodiment of the invention, a hook member is slidably attached to a recessed portion, and not configured to be detachable from the recessed portion.

Figure 17:
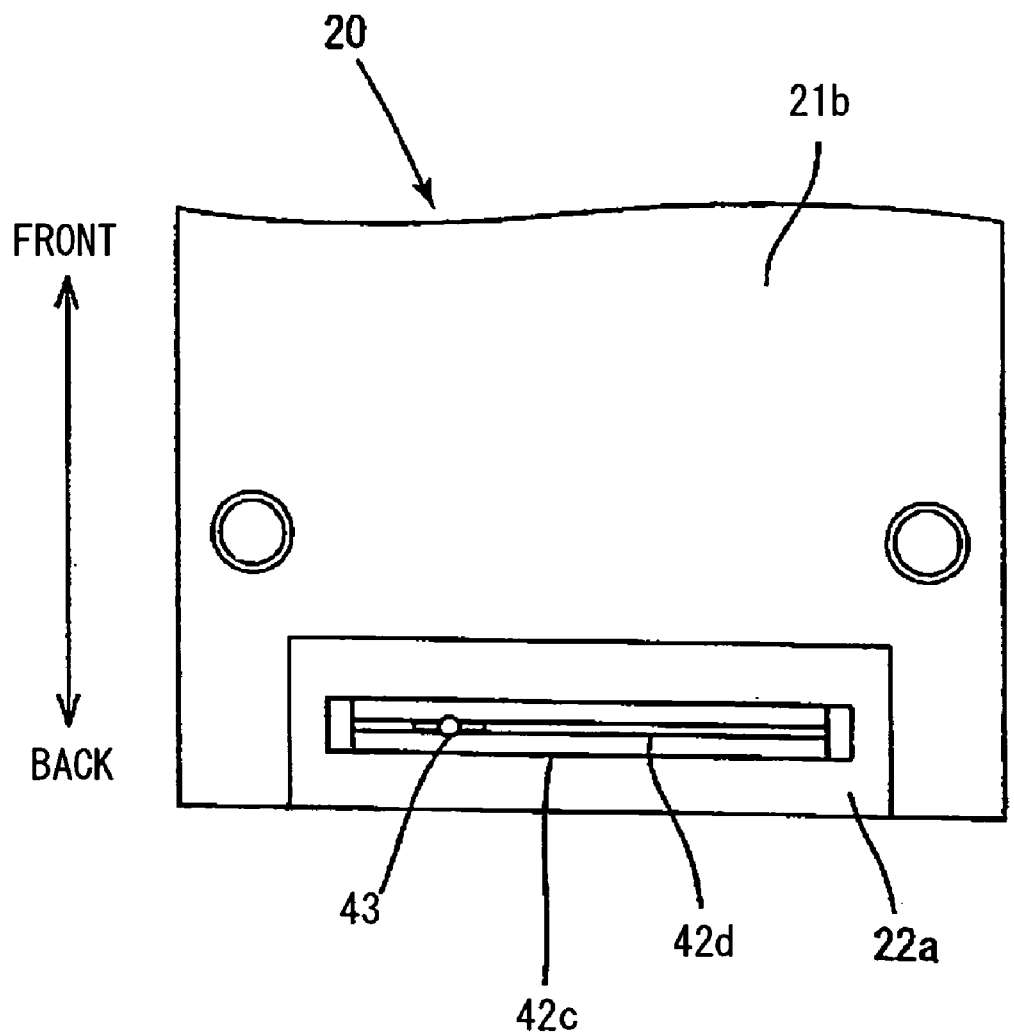
FIG. 17 is a bottom view of the relevant portion of a DVD player according to a fifth embodiment of the invention.
Figure 17:
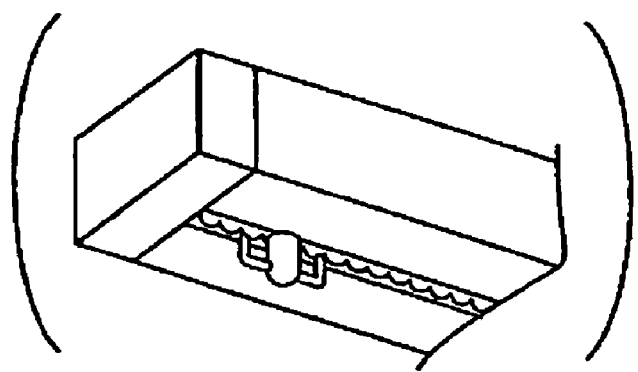
Figure 18:
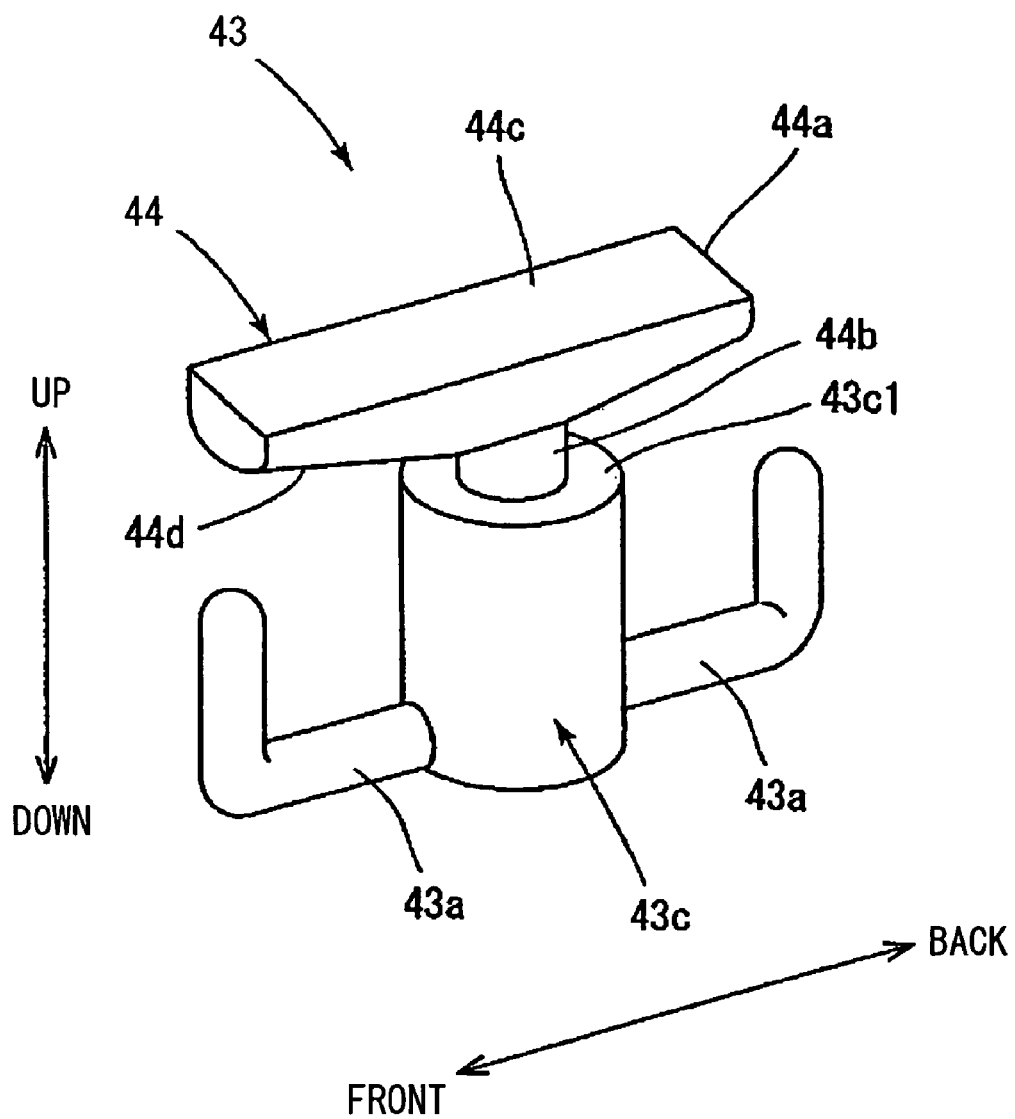
FIG. 18 is a perspective view showing the figure of a hook member according to the fifth embodiment.

FIG. 17 shows a bottom view of the relevant portion of the DVD player 20 in a DVD viewing system to which is applied a TV fixing structure according to the fourth embodiment, while FIG. 18 shows the figure of a hook member 43 of the DVD player 20 in a state where the hook member 43 is fixed to the recessed portion of the DVD player 20. The elements similarly constructed to the corresponding elements shown in FIG. 5 are denoted by the same reference numerals and not described here.

On the horizontal surface 22a of the recessed portion, a rail member 42c is attached such that the rail member 42c extends in the left-right direction. The rail member 42c has a fixing slit 42d open downward. The fixing slit 42d linearly extends in the left-right direction with a length defining a movable range of the hook member 43.

The hook member 43 has a slit insert portion 44 inserted in the fixing slit 42d. The slit insert portion 44 has a lock bar 44a which is configured to be oriented in the front-back direction when the hook member 43 is slidably attached to the recessed portion, and a cylindrical connecting portion 44b which connects an upper end 43c1 of a main portion 43c of the hook member 43 and a lower end of the lock bar 44a. The lock bar 44a has a dimension in the left-right direction (or width) larger than that of the lock bar 24a of the hook member 23 according to the first embodiment, such that a top surface 44c of the lock bar 44a is a planar surface having a rectangular shape whose width is slightly larger than that of the fixing slit 42d. A diameter of the connecting portion 44b is slightly smaller than the width of the fixing slit 42d. The main portion 43c of the hook member 43 has a cylindrical shape having a diameter larger than the width of the fixing slit 42d. Hence, the hook member 43 can not be get through the fixing slit 42d, and is turnable around an axis extending in the same (substantially same) direction as the direction in which the slit insert portion 44 extends (i.e., vertical direction) through the fixing slit 42d. In a state where the longer side of the top surface 44c is oriented to be aligned with the extending direction of the fixing slit 42d, the hook member 43 is slidable on the horizontal surface 22a of the recessed portion along the fixing slit 42d.

Figure 19:
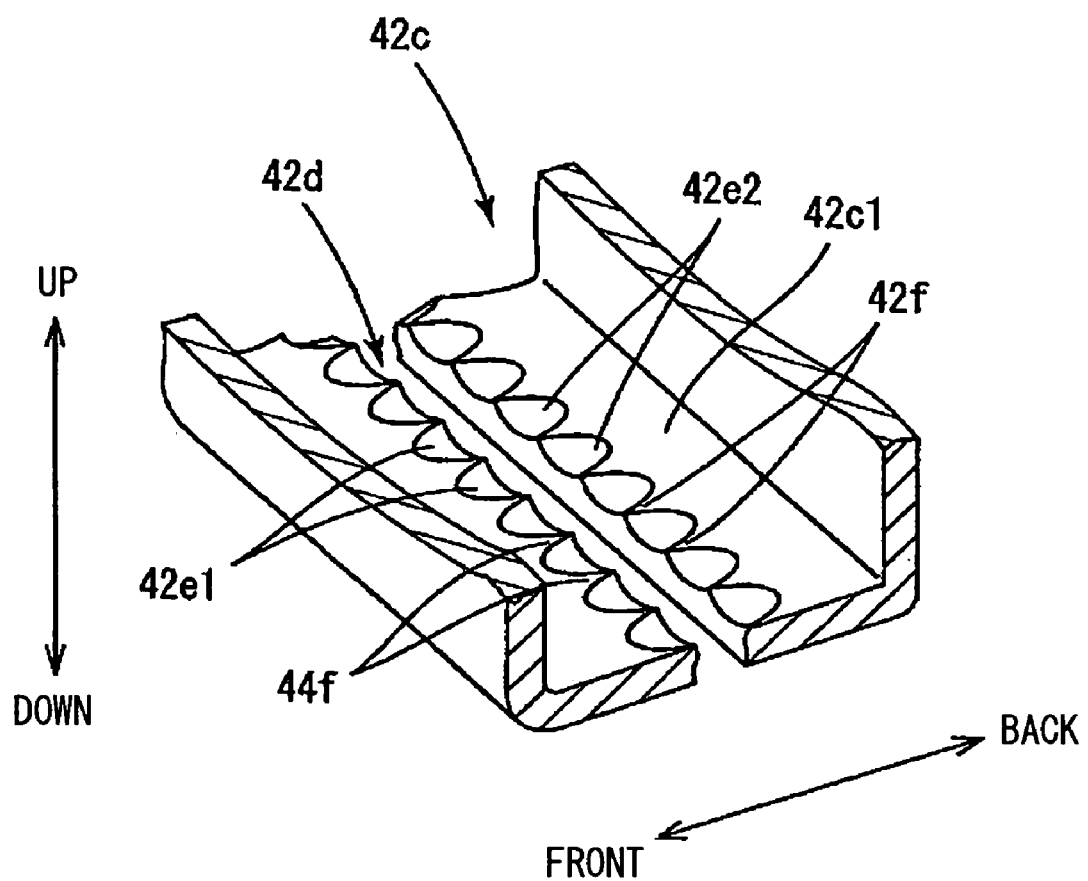
FIG. 19 is a perspective view showing a fixing slit as seen from the upper side, according to the fifth embodiment.

FIG. 19 is a perspective view of a part of the rail member 42c cut away in the width direction, as seen from the inner, upper side. The fixing slit 42d is defined in a widthwise middle portion of the rail member 42c. As shown in FIG. 19, in the upper surface 42c1 of a bottom side or horizontal portion of the rail member 42c are formed multiple front-side dents 42e1 and multiple back-side dents 42e2, respectively arranged in a row, adjacent to, and on the front side and back side of, the fixing slit 42d. Each dent 42e1, 42e2 has a gently curved semielliptic surface whose major axis extends in the front-back direction. In the state where the upper end 43c1 of the main body 43c is held in contact with the under surface of the horizontal portion of the rail member 42c, a portion of an under surface 44d of the lock bar 44a is located slightly below the upper surface 42c1 of the horizontal portion of the rail member 42c.

The lock bar 44a of the slit insert portion 44 has a tapered shape such that the dimension of the lock bar 44a in the vertical direction gradually decreases frontward and backward from its central portion, and the under surface 44d of the lock bar 44a is curved such that the central portion of the under surface 44d in the left-right direction is gradually raised downward.

When a pair of extensions 43a of the hook member 43 is turned clockwise or counterclockwise 90-degree so as to be oriented in the front-back direction, the under surface 44d of the lock bar 44a is held in sliding and pressing contact with peripheries 44f, 42f of the front- and back-side dents 42e1, 42e2, with the lock bar 44a being flexibly deformed by the pressing force. When the lock bar 44a has turned 90-degree and surmounted the peripheries 44f, 42f, the under surface 44d is fitted in one of the front-side dents 42e1 and one of the back-side dents 42e2. In this state, the lock bar 44a is oriented in the front-back direction. It is noted that the connecting portion 44b can be rotated 90-degree in the fixing slit 42d.

In this manner, the hook member 43 is fixed at a desired position within the movable range, by turning the slit insert portion 44 to its predetermined fix position when the slit insert portion 44 is located at the desired position.

When the extensions 43a of the fixed hook member 43 are turned clockwise or counterclockwise 90-degree so as to be oriented in the left-right direction, the under surface 44d of the lock bar 44a is held in sliding and pressing contact with the peripheries 44f, 42f of the dents 42e1, 42e2, with the lock bar 44a being flexibly deformed by the pressing force. When the lock bar 44a has turned 90-degree and surmounted the peripheries 44f, 42f, the longer side of the top surface 44c is oriented to be aligned with the extending direction of the fixing slit 42d, in which state the hook member 32 can be moved or slided along the fixing slit 42d.

In this manner, the hook member 43 is made slidable along the fixing slit 42d while the slit insert portion 44 is turned to its predetermined move position.

According to the above-described fifth embodiment, the hook member can be fixed at any position within the movable range of the hook member, by a simple manipulation that the slit insert portion of the hook member is turned at a desired position along the fixing slit of the DVD player. Thus, the freedom in positioning the hook member is improved, enabling the power cord of various kinds of TVs having respective power-cord attaching positions to be wound around the hook member which is located at a further convenient position for the winding the power cord. Therefore, the structure of the fifth embodiment enhances the convenience of the user, as well as makes it possible to fix various kinds of TVs to the electrical apparatus as the mounting body with an enhanced reliability.

According to a sixth embodiment of the invention, a hook member is fixed to a recessed portion in a manner other than the turning the hook member as in the above-described embodiments.

Figure 20:
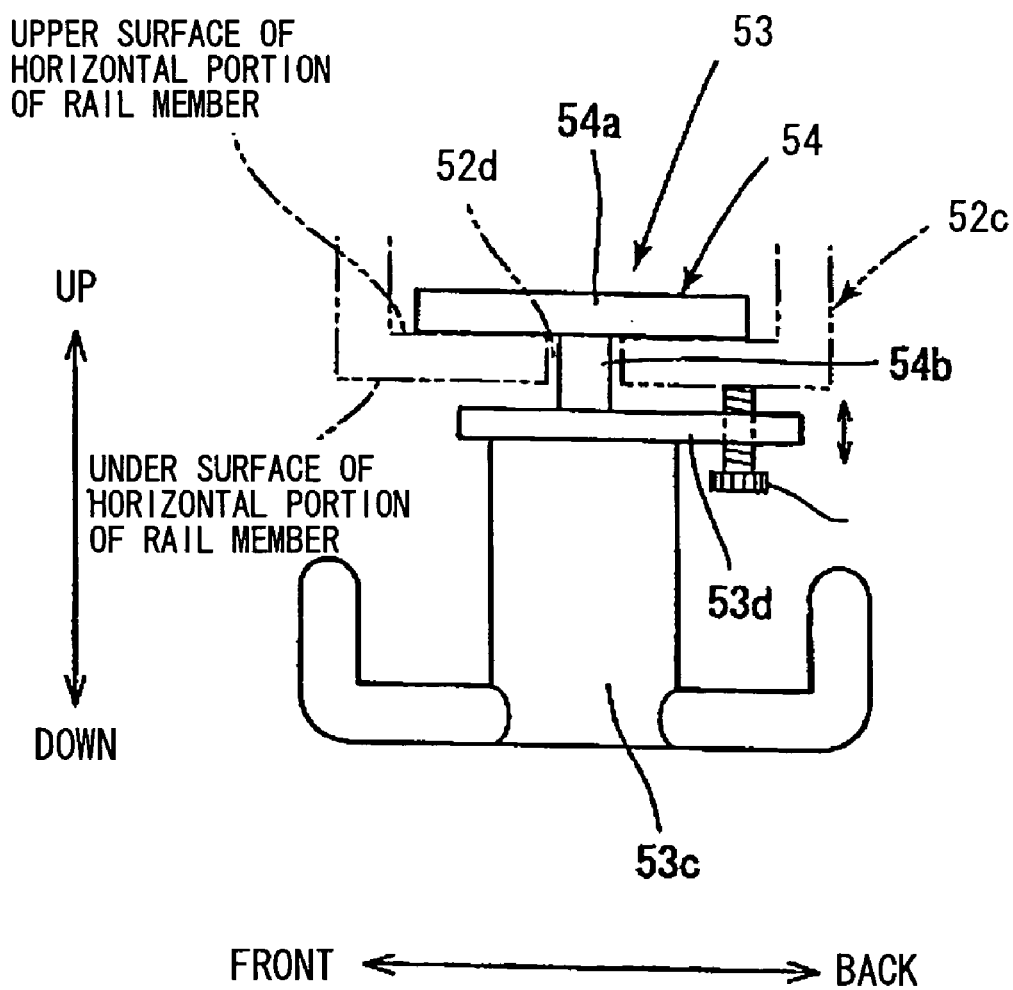
FIG. 20 is a right side view of a hook member according to a sixth embodiment of the invention.

FIG. 20 is a right side view of a hook member 53 of a DVD player in a DVD viewing system to which is applied the TV fixing structure according to the sixth embodiment.

In the recessed portion of the DVD player, a rail member 52c similar to the rail member 42c of the fifth embodiment is disposed. The hook member 53 has a slit insert portion 54 and a fixing screw 55. The slit insert portion 54 is inserted in a fixing slit 52d such that the insert portion 54 is movable along the fixing slit 52d. The fixing screw 55 is capable of fixing the hook member 53 to the recessed portion at a position along the fixing slit 52d. The hook member 53 has a main portion 53c and a screw supporting plate 53d having a planar shape and disposed on the main portion 53c. In a back side portion of the screw supporting plate 53d is formed a threaded hole to engage with the screw 55. The slit insert portion 54 has a disc-shaped fixing portion 54a and a cylindrical connecting portion 54b connecting an upper end of the screw supporting plate 53d and an under side of the disc-shaped fixing portion 54a. A diameter of the fixing portion 54a is larger than a width of the fixing slit 52d, while a diameter of the connecting portion 54b is slightly smaller than the width of the fixing slit 52d. A diameter of the cylindrical main portion 53c is larger than the width of the fixing slit 52d. Hence, the hook member 53 is movable or slidable on the surface of the recessed portion along the fixing slit 52d.

The fixing screw 55 is inserted in the threaded hole formed through the screw supporting plate 53d from the under side toward the upper side. Turning the screw 55 in the tightening direction (e.g., clockwise direction) has the upper end of the screw 55 go up, while turning the screw 55 in the loosening direction (e.g., counterclockwise direction) has the upper end go down. When the screw 55 is turned in the tightening direction at a desired position along the fixing slit 52d, the upper end of the screw 55 is brought into abutting contact with the under surface of the rail member 52c. This renders a portion of the rail member 52c in the vicinity of the fixing slit 52d clamped by the upper end of the screw 55 against the fixing portion 54a. The hook member 53 is thereby fixed to the recessed portion of the DVD player. On the other hand, when the screw 55 is turned in the loosening direction, the upper end of the screw 55 is retracted away from the under surface of the rail member 52c, so that the hook member 53 is made movable along the fixing slit 52d.

According to the six embodiment, the hook member can be fixed at any desired position within its movable range, by a simple manipulation that the fixing screw is turned at a desired position along the fixing slit of the DVD player. Thus, the freedom in positioning the hook member is improved, enabling the power cord of various kinds of TVs having respective power-cord attaching positions to be wound around the hook member which is located at a further convenient position for the winding the power cord. Therefore, the structure of the sixth embodiment enhances the convenience of the user, as well as makes it possible to fix various kinds of TVs to the electrical apparatus as the mounting body with an enhanced reliability.

According to a seventh embodiment of the invention, a plurality of combinations each consisting of a hook member and a fixing slit is provided.

Figure 21:
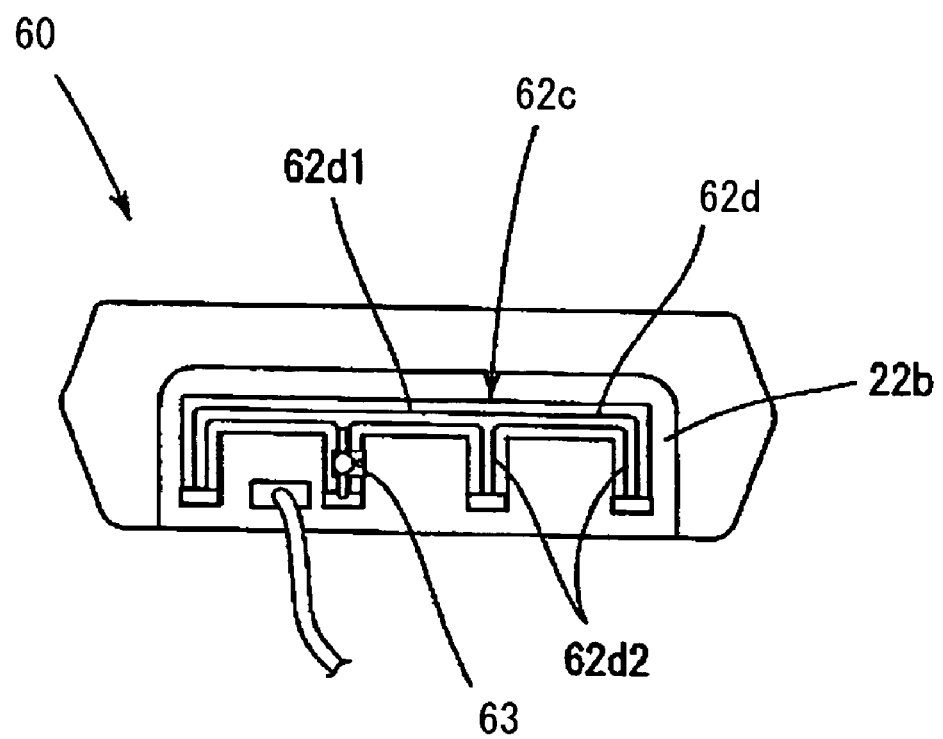
FIG. 21 is a back view showing a DVD player constituting a structure for fixing a television according to an eighth embodiment of the invention.

Further, according to an eighth embodiment of the invention, a fixing slit 62*d* has a comb-like shape as shown in FIG. 21. In the eighth embodiment, a rail member 62*c* is disposed in a vertical surface 22*b* of a recessed portion, and a hook member 63 extends backward and is movable or slidable along the fixing slit 62*d* formed in the rail member 62*c*.

The fixing slit 62*d* has a horizontal segment 62*d*1 and a plurality (four in this case, as shown in FIG. 21) of vertical segments 62*d*2 respectively extend downward from a plurality (four in this case) of points of the horizontal segment 62*d*1. In the horizontal segment 62*d*1, the hook member 63 is slidable in the horizontal (substantially horizontal) direction relatively to the DVD player. Thus, various kinds of TVs having respective power-cord attaching positions can be easily and securely fixed to the electrical apparatus as the mounting body, with a simple structure.

On the other hand, in the vertical segments 62*d*2, the hook member 63 is slidable in the vertical (substantially vertical) direction relatively to the DVD player. By sliding downward the hook member 63 around which the power cord of the TV mounted on the DVD player is wound, the tension of the power cord can be increased. Conversely, by sliding upward the hook member around which the power cord is wound, the tension of the power cord can be decreased. Thus, the tension of the power cord of the TV can be adjusted, making it possible to prevent the TV from falling down in the event of an accident such as an earthquake, with a further enhanced reliability.

In addition, the comb-like shape of the fixing slit 62*d* facilitates positioning the hook member finely correspondingly to the kind of the TV or its power-cord attaching position, as well as appropriately adjusting the tension of the power cord. Therefore, the convenience of the user is significantly improved and it is enabled to easily and securely fix various kinds of TVs having respective power-cord attaching positions.

Further, dents dug in the downward (substantially downward) direction, in which the legs of the TV are inserted downward (substantially downward) may be formed in the mounting surface of the DVD player. According to this arrangement where the legs of the TV mounted on the electrical apparatus as the mounting body are inserted or fitted in the dents, the TV is inhibited from displacing. Thus, the falling down of the TV upon a vibration is imposed on the TV is further effectively prevented. In this regard, the number of dents may be larger than that of the legs of the TV, so that the legs of various kinds of TVs having respective leg-attaching positions in the bottom face (where legs are attached to the main body of the TV) are fitted in dents which are located at the most convenient positions for inserting the respective legs. This arrangement enhances the convenience.

(4) Conclusion

As apparent from the above description of the embodiments of the present invention, the invention provides a structure for fixing a television or an electrical apparatus, which is convenient and enables to easily and securely fix various electrical apparatuses having respective insulated-electric-wire attaching positions, to a mounting body without requiring an additional member such as a belt, so as to prevent the television or electrical apparatus from falling down in the event of an accident such as an earthquake. The invention is applicable to a method for fixing an electrical apparatus, as well.

What is claimed is:

1. A structure for fixing a television to a mounting body when the television is mounted on the mounting body, for preventing the television from falling down when a vibration is imposed upon the television, the television having a cabinet, and a power cord which has an equipment end fixed to the cabinet and extends substantially backward from the cabinet, wherein the mounting body is an electrical apparatus on which the television is to be mounted, wherein the electrical apparatus has: a recessed portion on an edge formed by a bottom face and a back face of the electrical apparatus; and a hook member which is detachably fixed to one of a plurality of attaching places provided in the recessed portion so that a position at which the hook member is fixed to the recessed portion is changeable, the hook member extending substantially downward from the recessed portion when fixed to one of the attaching places so that the power cord is securely wound around the hook member, and having a pair of horizontal extensions which extend from a lower end of the hook member substantially horizontally and in respective directions which are substantially opposite, so as to prevent the power cord wound around the hook member from falling away from the hook member by the presence of the horizontal extensions, the horizontal extensions having respective prongs extending substantially upward from respective ends of the horizontal extensions, wherein the recessed portion has a plurality of fixing bores formed at the respective attaching places, wherein the hook member has an insert portion which is inserted into one of the plurality of the fixing bores and turned there so that the hook member is fixed to the recessed portion at one of the plurality of the attaching places corresponding to the one fixing bore, and wherein the power cord is securely wound around the hook member by being sequentially and repeatedly inserted from one of a pair of first intervals each defined between an upper end of each of the prongs and a ceiling of the recessed portion, into corresponding one of a pair of second intervals each defined between each of the horizontal extensions and the ceiling, and then from the other of the pair of first intervals into the corresponding second interval so that the television is fixed to the electrical apparatus on which the television is mounted.

2. A structure for fixing, to a mounting body, an electrical apparatus having an insulated electric wire extending therefrom, when the electrical apparatus is mounted on the mounting body, wherein the mounting body has a main body and a hook member which is fixed to the main body at a fixing position which is changeable, and wherein the insulated electric wire is securely wound around the hook member so that the electrical apparatus is fixed to the mounting body.

3. The structure according to claim 2, wherein the mounting body is another electrical apparatus.

4. The structure according to claim 3,
wherein the main body has a recessed portion on an edge formed by a bottom face and a side face of the another electrical apparatus, and
wherein the hook member has the shape of an elongated extension and is fixed to the recessed portion such that the hook member extends from the recessed portion substantially downward.

5. The structure according to claim 3, wherein the hook member is detachably fixed at one of a plurality of attaching places provided in the main body.

6. The structure according to claim 5,
wherein the main body has a plurality of fixing bores formed at the respective attaching places, and
wherein the hook member has an insert portion which is inserted into one of the plurality of fixing bores and turned there so that the hook member is fixed to the main body at one of the plurality of the attaching places corresponding to the one fixing bore.

7. The structure according to claim 5,
wherein the main body has a plurality of fixing bores formed at the respective attaching places, and
wherein the hook member has an insert portion which is inserted into one of the plurality of fixing bores and slidingly moved in a direction other than a direction in which the insert portion is inserted into the one fixing bore, so that the hook member is fixed to the main body at one of the plurality of the attaching places corresponding to the one fixing bore.

8. The structure according to claim 3, wherein the hook member is slidable within a movable range on a surface of the main body and is fixable to the main body at a position within the movable range.

9. The structure according to claim 8,
wherein the main body has a fixing slit having a length corresponding to the movable range of the hook member, and
wherein the hook member has a slit insert portion which is inserted into the fixing slit and turned around an axis extending in a direction substantially identical to the direction in which the slit insert portion is inserted into the fixing slit, the hook member being fixed to the main body at a position within the movable range by turning the slit insert portion around the axis to a predetermined fix position for locking the hook member when the hook member is located at the position, and being unfixed to be movable along the fixing slit by turning the slit insert portion around the axis to a predetermined move position for allowing the sliding movement of the hook member.

10. The structure according to claim 8,
wherein the main body has a fixing slit having a length corresponding to the movable range of the hook member, and
wherein the hook member has a slit insert portion which is inserted into the fixing slit such that the hook member is slidable along the fixing slit, and a fixing screw capable of fixing the hook member to the main body at a position along the fixing slit.

11. A structure for fixing a first electrical apparatus as a mounting body and a second electrical apparatus mounted on the first electrical apparatus, to each other, each of the first electrical apparatus and the second electrical apparatus having an insulated electric wire extending therefrom,
wherein one of the first electrical apparatus and the second electrical apparatus has a main body, and a hook member which is fixed to the main body, the position on the main body at which the hook member is fixed being changeable, and the insulated electric wire of the other of the first electrical apparatus and the second electrical apparatus being securely wound around the hook member, so that the first and second electrical apparatuses are fixed to each other.

12. A method of fixing to a mounting body an electrical apparatus having an insulated electric wire extending therefrom, when the electrical apparatus is mounted on the mounting body, comprising steps of:
providing the mounting body with a main body and a hook member which is fixed to the main body, the position on the main body at which the hook member is fixed being changeable, and the insulated electric wire being able to be wound around the hook member; and
securely winding the insulated electric wire around the hook member so that the electrical apparatus is fixed to the mounting body.

13. A method of fixing a first electrical apparatus as a mounting body and a second electrical apparatus mounted on the first electrical apparatus, to each other, each of the first electrical apparatus and second electrical apparatus having an insulated electric wire extending therefrom, comprising steps of:
providing one of the first electrical apparatus and the second electrical apparatus with a main body and a hook member which is fixed to the main body, the position on the main body at which the hook member is fixed being changeable, and the insulated electric wire being able to be wound around the hook member; and
securely winding the insulated electric wire of the other of the first electrical apparatus and the second electrical apparatus around the hook member, so that the first and second electrical apparatuses are fixed to each other.

* * * * *